United States Patent
Kagaya

(10) Patent No.: US 10,614,015 B2
(45) Date of Patent: Apr. 7, 2020

(54) CIRCUIT DEVICE, ELECTRONIC DEVICE, AND CABLE HARNESS

(71) Applicant: SEIKO EPSON CORPORATION, Tokyo (JP)

(72) Inventor: Ryuichi Kagaya, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/364,721

(22) Filed: Mar. 26, 2019

(65) Prior Publication Data

US 2019/0303330 A1    Oct. 3, 2019

(30) Foreign Application Priority Data

Mar. 27, 2018  (JP) ................. 2018-059310

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

2002/0062457 A1    5/2002  Kamihara
2005/0182867 A1*   8/2005  Reynolds .............. G06F 11/325
                                                       710/33

FOREIGN PATENT DOCUMENTS

JP    2002-141911 A    5/2002
JP    2006-135397 A    5/2006

* cited by examiner

*Primary Examiner* — Scott C Sun
(74) *Attorney, Agent, or Firm* — Oliff PLC

(57) ABSTRACT

A circuit device includes first and second physical layer circuits, a bus switch circuit that switches connection between a first bus and a second bus, which are compliant with the USB standard, ON in a first period and OFF in a second period, and a processing circuit that performs processing for transferring a packet in a transfer route constituted by the first bus, the first and second physical layer circuits, and the second bus, in the second period. The second physical layer circuit includes a disconnection detection circuit that detects device disconnection of a device connected to the second bus side. If device disconnection is detected in the second period, the connection between the first bus and the second bus is switched from off to on after a wait period has elapsed from the timing at which the device disconnection was detected.

14 Claims, 21 Drawing Sheets

CIRCUIT DEVICE, ELECTRONIC DEVICE, AND CABLE HARNESS

BACKGROUND

This application claims priority to Japanese Patent Application No. 2018-059310, filed Mar. 27, 2018. The disclosure of the prior application is hereby incorporated in its entirety therein.

1. Technical Field

The present invention relates to a circuit device, an electronic device, a cable harness, and the like.

2. Related Art

A circuit device that realizes USB (Universal-Serial-Bus) data transfer control is known. The techniques disclosed in JP-A-2006-135397 and JP-A-2002-141911 are known examples of such a circuit device. For example, JP-A-2006-135397 discloses technology in which an enable control signal for a current source of an HS (High Speed) mode transmission circuit is set to active at a timing before a packet transmission start timing. JP-A-2002-141911 discloses technology in which, in the case where a switch from the HS mode to an FS (Full Speed) mode is performed, self-running is disabled for a PLL that generates a high-speed clock for the HS mode.

In USB technology, an HS mode transmission circuit is provided in a physical layer circuit. However, parasitic capacitance and parasitic resistance exist in the signal path of transmission signals in the HS mode transmission circuit, there is a problem in that the signal property of transmission signals degrades due to this parasitic capacitance and parasitic resistance. Also, in USB technology, the host needs to be able to appropriately detect the disconnection of a device on the bus.

SUMMARY

One aspect of the invention relates to a circuit device including: a first physical layer circuit to which a first bus compliant with a USB standard is to be connected; a second physical layer circuit to which a second bus compliant with the USB standard is to be connected; a bus switch circuit that, one end of the bus switch circuit being connected to the first bus and another end being connected to the second bus, switches on connection between the first bus and the second bus in a first period, and switches off the connection in a second period; and a processing circuit that performs, in the second period, transfer processing for transmitting a packet received from the first bus via the first physical layer circuit to the second bus via the second physical layer circuit, and transmitting a packet received from the second bus via the second physical layer circuit to the first bus via the first physical layer circuit, wherein the second physical layer circuit includes a disconnection detection circuit on a second bus side that detects device disconnection of a device connected to the second bus side, and the bus switch circuit, if the device disconnection is detected by the disconnection detection circuit on the second bus side, in the second period, switches the connection between the first bus and the second bus from off to on after a wait period has elapsed from a timing at which the device disconnection was detected.

Also, in one aspect of the invention, the circuit device may further include a timer circuit that measures an elapse of the wait period from the timing at which the device disconnection was detected.

Also, in one aspect of the invention, when an issue interval of an SOF packet is denoted as TSF, the length TW of the wait period may satisfy TW>TSF.

Also, in one aspect of the invention, TW≥2×TSF may be satisfied.

Also, in one aspect of the invention, if the device disconnection is detected, the processing circuit may stop the transfer processing, and the bus switch circuit may switch connection between the first bus and the second bus from off to on after the wait period has elapsed from the timing at which the device disconnection was detected.

Also, in one aspect of the invention, the first physical layer circuit includes a disconnection detection circuit on a first bus side that detects device disconnection with respect to the first bus, and when connection between the first bus and the second bus is off, if the device disconnection is detected by the disconnection detection circuit on the first bus side, the bus switch circuit may switch the connection between the first bus and the second bus from off to on after the wait period has elapsed from the timing at which the device disconnection was detected.

Also, in one aspect of the invention, the first physical layer circuit includes a first upstream port detection circuit that detects whether or not the first bus is a bus on an upstream side, the second physical layer circuit includes a second upstream port detection circuit that detects whether or not the second bus is a bus on the upstream side, if the first bus is determined to be a bus on the upstream side, the disconnection detection circuit on the second bus side may detect the device disconnection with respect to the second bus, and if the second bus is determined to be a bus on the upstream side, the disconnection detection circuit on the first bus side may detect the device disconnection with respect to the first bus.

Also, in one aspect of the invention, the first upstream port detection circuit may determine, when a packet received from the first bus is detected to be an SOF packet, that the first bus is a bus on the upstream side, and the second upstream port detection circuit may determine, when a packet received from the second bus is detected to be an SOF packet, that the second bus is a bus on the upstream side.

Also, in one aspect of the invention, the processing circuit, upon receiving an SOF packet from the first bus, may perform processing for transmitting a repeat packet of the SOF packet to the second bus, and the disconnection detection circuit on the second bus side may detect the device disconnection by detecting a signal amplitude of an EOP in the repeat packet of the SOF packet.

Also, in one aspect of the invention, the circuit device further includes a bus monitor circuit that performs operation of monitoring the first bus and the second bus. The bus switch circuit may switch connection between the first bus and the second bus on or off based on a monitoring result of the bus monitor circuit.

Also, in one aspect of the invention, the bus monitor circuit, when the device disconnection is detected, may output a signal for stopping the transfer processing of the processing circuit to the processing circuit, and output a signal for switching connection between the first bus and the second bus from off to on to the bus switch circuit, after the wait period has elapsed from a timing at which the device disconnection was detected.

Also, another aspect of the invention pertains to an electronic device including the circuit device according to any of the above aspects, and a processing device to be connected to the first bus.

Also, another aspect of the invention pertains to a cable harness including the circuit device according to any of the above aspects, and a cable.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following is a detailed description of preferred embodiments of the invention. Note that the embodiments described below are not intended to unduly limit the content of the invention recited in the claims, and all of the configurations described in the embodiments are not necessarily essential as solutions provided by the invention.

1. Signal Characteristics of Transmission Signals

Figure 1:
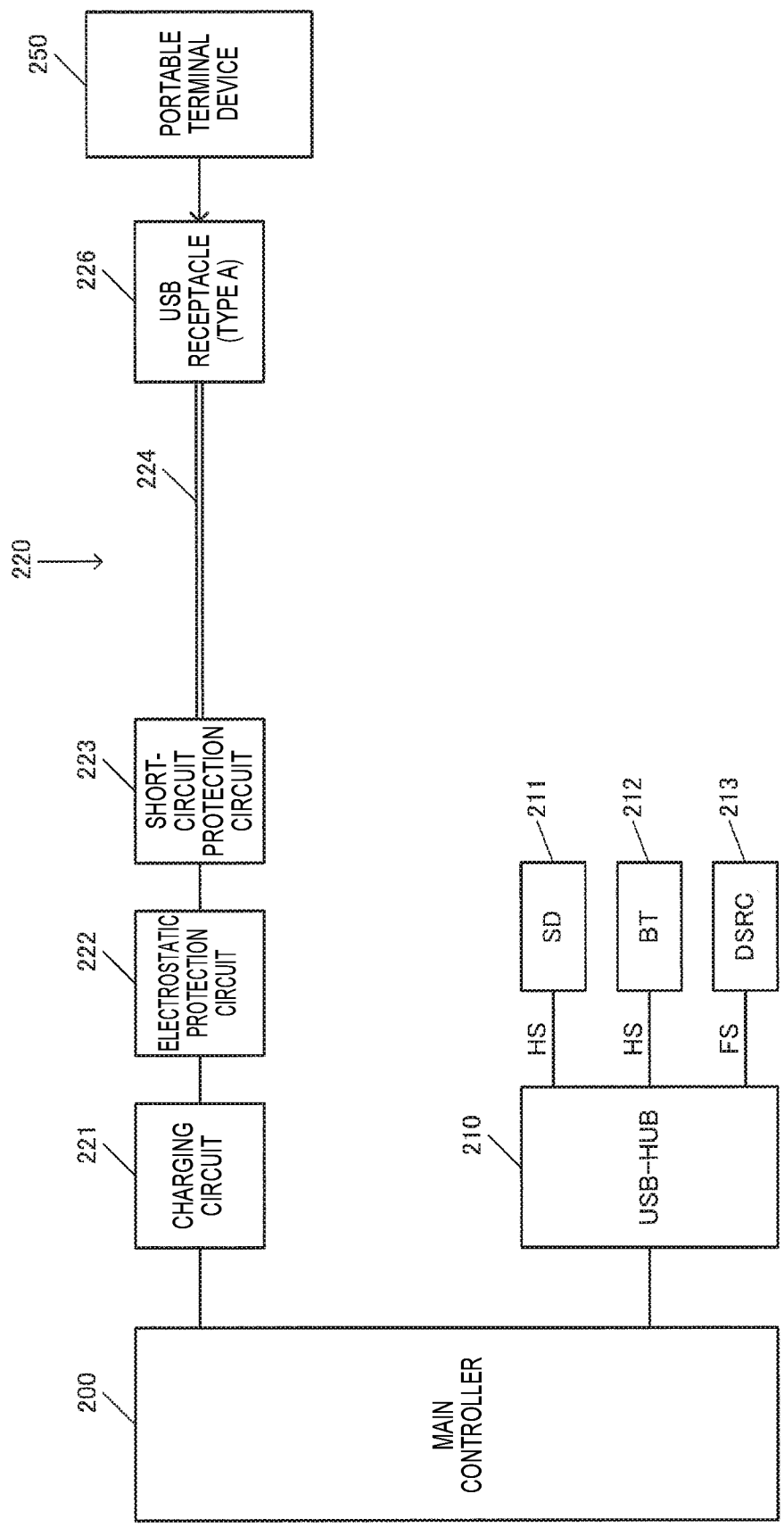
FIG. 1 is an illustrative diagram regarding a problem of degradation in the signal characteristics of a transmission signal.

Degradation in the signal characteristics of transmission signals in USB will be described below with reference to FIG. 1. FIG. 1 shows an example of a vehicle-mounted electronic device system in which a USB-HUB 210 is connected to a main controller 200, which is a host. In one example, an upstream port of the USB-HUB 210 is connected to the main controller 200, and a downstream port is connected to a device such as an SD 211, a BT 212, or a DSRC 213 (Dedicated Short Range Communications). The SD 211 is an SD card apparatus, and the BT 212 is a Bluetooth (registered trademark) apparatus. Also, a portable terminal device 250 such as a smartphone is connected to a USB receptacle 226 of a cable harness 220 that has a cable 224. A charging circuit 221, an electrostatic protection circuit 222, a short-circuit protection circuit 223, and the like are provided between the main controller 200 and the USB receptacle 226.

In FIG. 1, the cable 224 is routed so as to avoid the interior or the like of a vehicle, and therefore the cable tends to be very long, and parasitic capacitance and the like is generated. Furthermore, parasitic capacitance and the like is also generated due to circuits such as the charging circuit 221, the electrostatic protection circuit 222, and the short-circuit protection circuit 223. This parasitic capacitance and the like causes degradation in the signal characteristics of transmission signals in an USB HS transmission circuit of the main controller 200. On the other hand, in a USB authentication test, it is required that the waveforms of transmission signals do not overlap a keep-out region of an EYE pattern. However, the signal quality of the transmission signals degrades if parasitic capacitance and the like is generated due to elongation of the cable 224 that is routed in the vehicle in FIG. 1. For this reason, a problem occurs in which appropriate signal transfer cannot be realized, and the EYE pattern authentication test at a near-end cannot be passed.

Also, in USB technology, it is necessary to appropriately detect the disconnection of a device. For example, in FIG. 1, assume that a user has disconnected the portable terminal device 250 from the USB receptacle 226. In this case, the main controller 200, which is the host, needs to be able to appropriately detect the disconnection of the portable terminal device 250, which is the aforementioned device, from the USB.

2. Exemplary Configuration of Circuit Device

Figure 2:
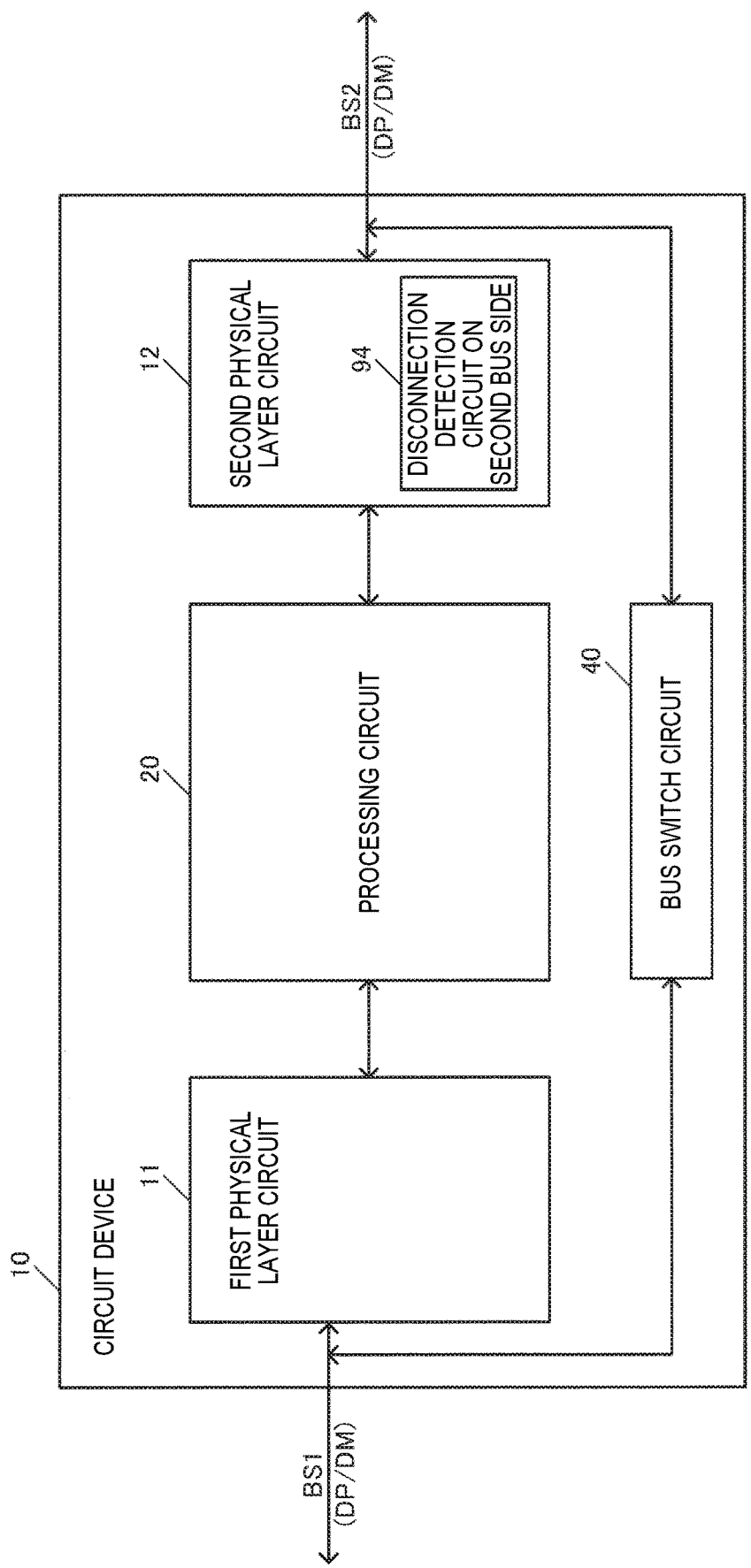
FIG. 2 shows an exemplary configuration of a circuit device according to an embodiment of the invention.

FIG. 2 shows an exemplary configuration of a circuit device 10 of this embodiment. The circuit device 10 includes first and second physical layer circuits 11 and 12, a processing circuit 20, and a bus switch circuit 40. The second physical layer circuit 12 includes a disconnection detection circuit 94 on a second bus side. Note that the circuit device 10 is not limited to the configuration in FIG. 2, and various modifications can be carried out, such as omitting a portion of the constituent elements, or adding other constituent elements.

The first physical layer circuit 11 is connected to a USB-standard first bus BS1. The second physical layer circuit 12 is connected to a USB-standard second bus BS2. The first and second physical layer circuits 11 and 12 are each configured by physical layer analog circuits. Examples of the physical layer analog circuits include HS and FS transmission circuits and reception circuits, various detection circuits, and a pull-up resistor circuit. Note that the processing circuit 20 includes circuits that correspond to the link layer, such as a serial-to-parallel conversion circuit that converts serial data received via USB into parallel data, a parallel-to-serial conversion circuit that converts parallel data into serial data, an elastic buffer, and an NRZI circuit. For example, circuits that correspond to the link layer or the like of a USB transceiver macrocell are included in the processing circuit 20, and analog circuits such as a transmission circuit, a reception circuit, and detection circuits are included in the first and second physical layer circuits 11 and 12.

The first bus BS1 is the bus to which the main controller is connected for example, and the second bus BS2 is the bus to which the peripheral device is connected for example. It should be noted that this embodiment is not limited to this connection configuration. The first and second buses BS1 and BS2 are buses that are compliant with the USB standard and include signal lines for signals DP and DM, which are first and second signals, that constitute differential signals. The first and second buses BS1 and BS2 can include power supply VBUS and GND signal lines. The USB standard is, more broadly, a given data transfer standard.

One end of the bus switch circuit 40 is connected to the first bus BS1, and the other end is connected to the second bus BS2. Also, the connection between the first bus BS1 and the second bus BS2 can be switched on and off. In other words, the first bus BS1 and the second bus BS2 can be electrically connected, or electrically disconnected. Switching on and off the connection between the first bus BS1 and the second bus BS2 refers to switching on and off switch elements provided between the DP and DM signal lines of the first bus BS1 and the DP and DM signal lines of the second bus BS2. Also, the connection between circuits and the connection between a bus or a signal line and a circuit in this embodiment are electrical connection. The electrical connection is a connection through which an electrical signal can be transmitted, and is a connection through which information can be transmitted by an electrical signal. The electrical connection may be a connection via a signal line, an active element, or the like.

Specifically, as shown in later-described FIG. 6, the bus switch circuit 40 switches on the connection between the first bus BS1 and the second bus BS2 in a first period T1. More specifically, the bus switch circuit 40 has a switch element provided between the first bus BS1 and the second bus BS2, and switches on that switch element in the first period T1. Accordingly, the main controller 200 that is connected to the first bus BS1 and the peripheral device 260 that is connected to the second bus BS2 can directly transfer USB signals via the USB bus. Note that a first switch element for the signal DP and a second switch element for the signal DM are provided as the switch elements, for example. Also, the main controller 200 and the peripheral device 260 are, more broadly, first and second devices. Also, as shown in later-described FIG. 7, the bus switch circuit 40 switches off the connection between the first bus BS1 and the second bus BS2 in a second period T2. More specifically, in the second period T2, a switch element provided between the first bus BS1 and the second bus BS2 is switched off. In this second period T2, the processing circuit 20 performs transfer processing that is described below.

The processing circuit 20 is a circuit that performs transfer processing and various types of control processing, and can be realized by, for example, a logic circuit obtained by automatic placement and routing, such as a gate array. Note that the processing circuit 20 may be realized by a processor such as a CPU or an MPU.

In the second period T2, the processing circuit 20 performs transfer processing in which packets received from the first bus BS1 via the first physical layer circuit 11 are transmitted to the second bus BS2 via the second physical layer circuit 12, and packets received from the second bus BS2 via the second physical layer circuit 12 are transmitted to the first bus BS1 via the first physical layer circuit 11. The transfer processing is performed in at least a portion of the second period T2, for example. For example, packets are transferred from the first bus BS1 to the second bus BS2 or from the second bus BS2 to the first bus BS1 without changing the packet format. At this time, the processing circuit 20 performs predetermined signal processing in this transfer processing. This predetermined signal processing is signal processing for packet transfer, and is for transferring repeat packets corresponding to received packets. For example, the processing circuit 20 performs predetermined packet bit resynchronization processing as the predetermined signal processing. For example, when a packet is received, the bits in the packet are sampled based on a clock signal generated by the circuit device 10. When a packet is transmitted, the bits in the packet are transmitted in synchronization with a clock signal generated by the circuit device 10. When packet transfer is performed on a transfer route TR2, in FIG. 7, that passes through the processing circuit 20, due to the processing circuit 20 performing predetermined signal processing, it is possible to realize high-quality signal transfer that improves degraded signal characteristics of USB transmission signals.

As shown in FIG. 2, the second physical layer circuit 12 includes the disconnection detection circuit 94 on the second bus side that detects the disconnection of a device on the second bus BS2. Hereinafter, the disconnection detection circuit 94 on the second bus side will be simply referred to as the disconnection detection circuit 94, as appropriate. The disconnection detection circuit 94 is a circuit that is used in detecting the disconnection of a device on the second bus BS2. The disconnection detection circuit 94 performs device disconnection detection (HS disconnection detection) in the case where a device connected to the second bus BS2 is detached so as to be disconnected from the second bus BS2. This device disconnection detection can be realized by detecting the amplitudes of the DP and DM signals on the second bus BS2. For example, in USB technology, a terminating resistor is provided in the physical layer circuits of the device and the host, and when the device is disconnected, the terminating resistor of the device is lost, and the signal amplitude of the signals DP and DM increase. Accordingly, device disconnection can be detected by detecting that the signal amplitude has exceeded a predetermined threshold value. That is, whether or not a device is disconnected can be detected by detecting whether or not the signal level of the signals DP and DM exceeds the threshold value. Specifically, device disconnection can be detected by detecting the signal amplitude of an EOP (End Of Packet) in the repeat packet of an SOF (Start Of Frame) packet, as will be described later.

Figure 7:
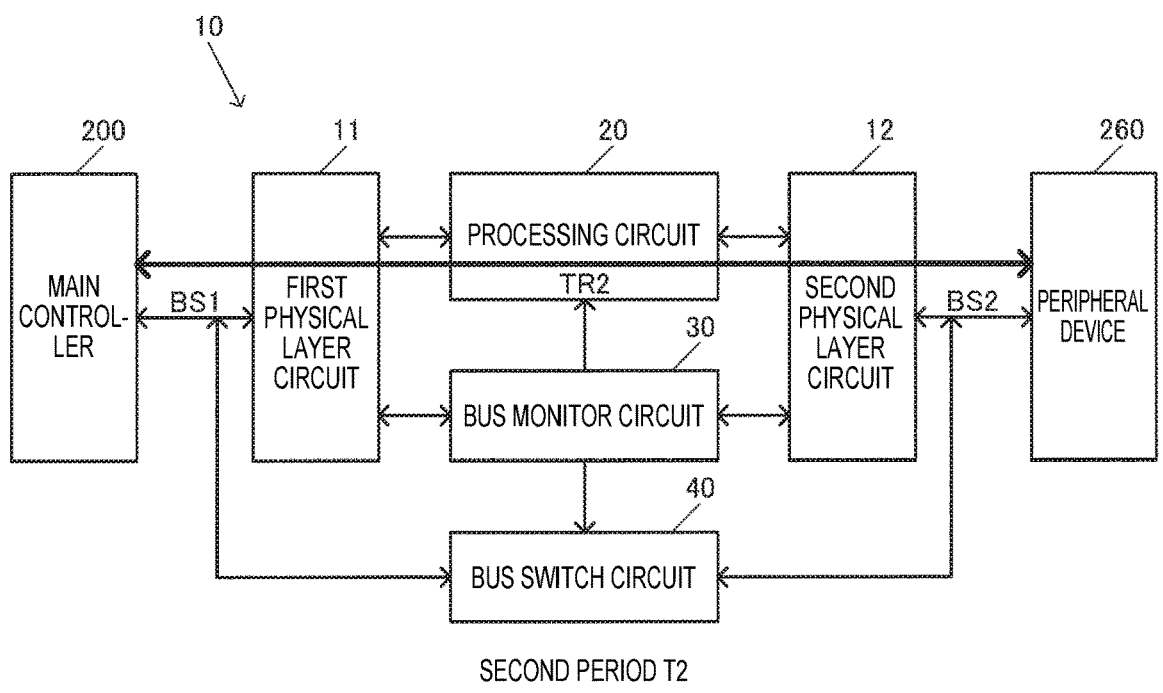
FIG. 7 is an illustrative diagram of operations of the circuit device.

In the period in which the connection between the first and second buses BS1 and BS2 is off, if device disconnection is detected by the disconnection detection circuit 94, the bus switch circuit 40 switches the connection between the first and second buses BS1 and BS2 from off to on after the wait period has elapsed from the timing at which device disconnection was detected. Specifically, assume that when transfer is being performed on the transfer route TR2 that passes through the first physical layer circuit 11, the processing circuit 20, and the second physical layer circuit 12 as shown in FIG. 7, device disconnection is detected. In this case, the bus switch circuit 40 does not immediately turn on the connection between the first bus BS1 and the second bus BS2, and keeps the connection between the first bus BS1 and the second bus BS2 in an off state until a set wait period has elapsed. Here, packet transfer processing by the processing circuit 20 through transfer route TR2 is stopped. Then, after the wait period has elapsed, the connection between the first and second busses BS1 and BS2 are switched from off to on. In this way, during the wait period, the main controller 200, which is a host, is connected to only the first bus BS1 between the main controller 200 and the circuit device 10, and the second bus is disconnected. With this, an adverse effect caused by a reflected wave generated due to impedance mismatch caused by device disconnection can be reduced, and the main controller 200 can appropriately detect the device disconnection. The wait period may be set such that the influence of the reflected wave can be avoided, and the host can appropriately detect device disconnection.

Specifically, in this embodiment, the bus switch circuit 40 switches on the connection between the first and second buses BS1 and BS2 in the first period T1, and switches off this connection in the second period T2. Also, in the second period T2, packet transfer is performed on the transfer route TR2 that passes through the first physical layer circuit 11, the processing circuit 20, and the second physical layer circuit 12. Accordingly, it is possible to realize high-quality signal transfer that improves degraded signal characteristics of USB transmission signals. However, when packet transfer is being performed on the transfer route TR2 shown in FIG. 7, if the peripheral device 260 connected to the second bus BS2 is detached so as to be disconnected from the second bus BS2, the connection between the first and second buses BS1 and BS2 is off in the bus switch circuit 40, and therefore the main controller 200 cannot detect this device disconnection.

In view of this, in this embodiment, the disconnection detection circuit 94 of the circuit device 10, instead of the main controller 200, detects disconnection of the peripheral device 260 from the second bus BS2. After device disconnection has been detected, the connection between the first and second buses BS1 and BS2 in the bus switch circuit 40 is switched from off to on, and USB signal transfer can be performed on the transfer route TR1 in FIG. 6.

In this case, the following method is conceivable, as a comparative example, for allowing the main controller 200, which is a host, to recognize device disconnection. That is, in the method of the comparative example, connection between the first bus BS1 and the second bus BS2 in the bus switch circuit 40 is switched from off to on immediately after the disconnection detection circuit 94 has detected device disconnection. Then, the main controller 200 detects device disconnection by detecting the signal amplitude of the signal DP or DM, for example, through the bus switch circuit 40 whose connection has been switched on.

However, when device disconnection in which the peripheral device 260 is removed is performed, the HS termination of 45Ω termination of the peripheral device 260 is lost, and an impedance unmatched state is entered. Therefore, a reflected wave with respect to the transmission wave of the main controller 200 is superimposed on the transmission wave with a delay, and a situation arises in which the main controller 200 cannot appropriately detect device disconnection. For example, in the method of the comparative example described above, since the connection in the bus switch circuit 40 is switched from off to on immediately after the disconnection detection circuit 94 has detected device disconnection, the reflected wave with respect to the transmission wave of the main controller 200 passes through the bus switch circuit 40 whose connection is switched on, and is superimposed on the transmission wave. Specifically, as will be described later, as a result of the reflected wave being superimposed on an SOF packet that the main controller 200 has transmitted, the increase of the signal amplitude of the EOP of an SOF is hampered, and the signal amplitude does not reach the disconnection detection level, and therefore, the main controller 200 cannot appropriately detect device disconnection.

Therefore, in this embodiment, even in a case where the disconnection detection circuit 94 has detected device disconnection, the connection between the first bus BS1 and the second bus BS2 is not immediately switched on until a wait period elapses. Since the connection between the first bus BS1 and the second bus BS2 remains off in this wait period, the transmission wave of the main controller 200 is not transmitted to the second bus BS2 side, and only the reflected wave on the first bus BS1 is superimposed on the transmission wave with a delay. Therefore, as a result of being not influenced by the second bus BS2 and influenced only by the delay of the reflected wave in the first bus BS1, the degree of superimposition of the reflected wave on the EOP of an SOF is smaller than that in the comparative example. As a result, the signal amplitude of the EOP of an SOF does not decrease below the disconnection detection level, and the main controller 200, which is a host, can detect device disconnection in the wait period, for example. Therefore, the device disconnection can be appropriately handled while improving degraded signal characteristics of USB signals.

Also, in this embodiment, when the disconnection detection circuit 94 has detected device disconnection, the processing circuit 20 stops transfer processing. That is, the transfer processing on the transfer route TR2 in FIG. 7 is stopped by setting the processing circuit 20 to an operation disabled state, which is a disabled state. At this moment, the outputs of the first physical layer circuit 11 and the second physical layer circuit 12 are in a high impedance state, and a state is entered that is equivalent to the case where the first physical layer circuit 11 and the second physical layer circuit 12 are respectively electrically disconnected from the first bus BS1 and the second bus BS2. That is, a state is entered that is the same as the device disconnection, when viewed from the main controller 200, which is a host. Then, the bus switch circuit 40 switches on the connection between the first bus BS and the second bus BS2 after the wait period has elapsed since device disconnection was detected and the processing circuit 20 stopped transfer processing. In this way, both the signal path via the bus switch circuit 40 and the signal path via the processing circuit 20 are disconnected in the wait period after the disconnection detection circuit 94 detected device disconnection. Therefore, during the wait period, only the first bus BS1 between the main controller 200, which is a host, and the circuit device 10 is connected, and the second bus BS2 is disconnected. With this, negative influence of a reflected wave due to impedance mismatch caused by device disconnection can be reduced, and the main controller 200 can appropriately detect device disconnection.

Figure 3:
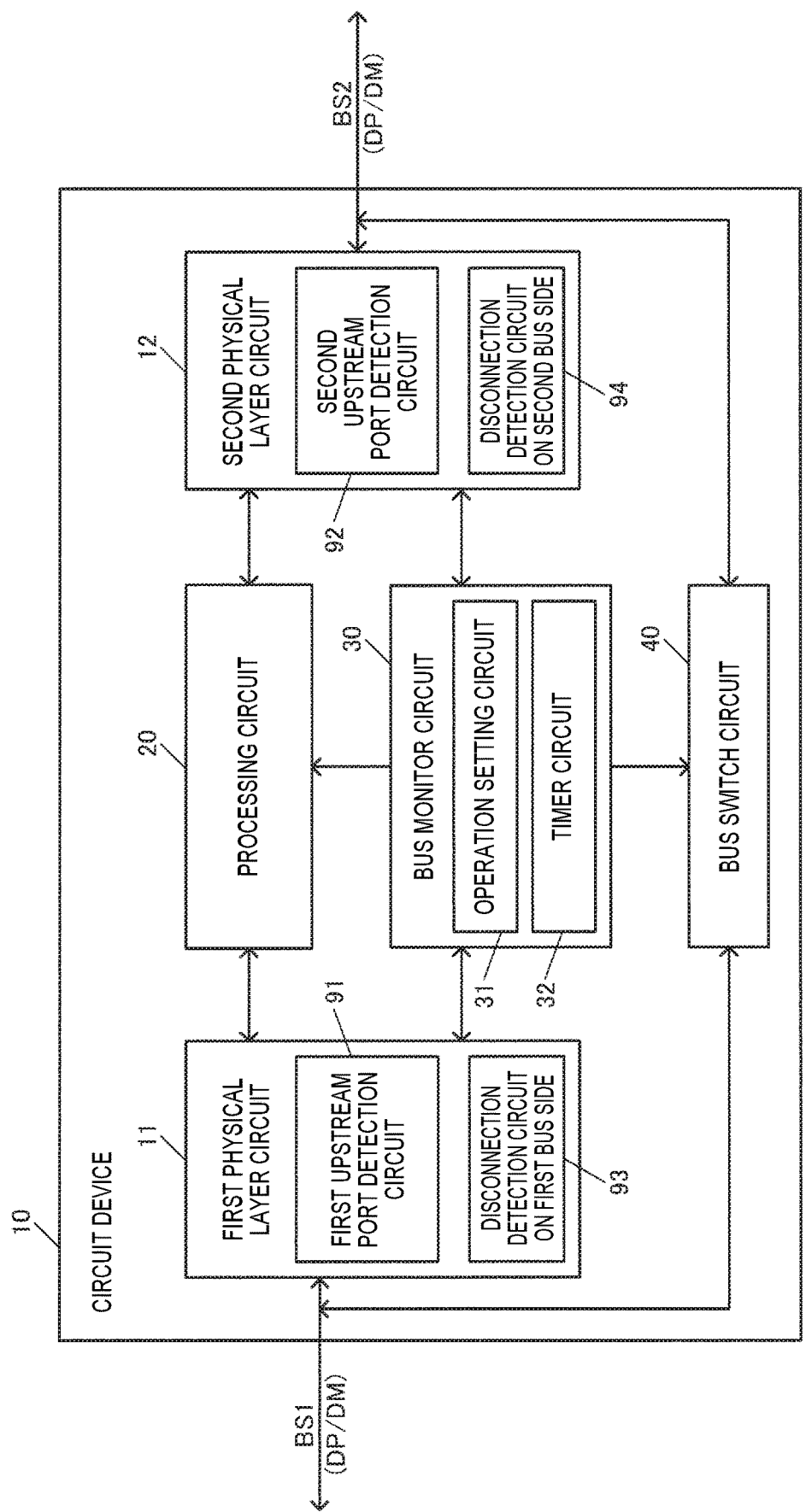
FIG. 3 shows a detailed exemplary configuration of the circuit device.

FIG. 3 shows a detailed exemplary configuration of the circuit device 10. In FIG. 3, the circuit device 10 includes a bus monitor circuit 30. The bus monitor circuit 30 performs a monitor operation for monitoring the first and second buses BS1 and BS2. For example, this is a monitor operation for monitoring the state of at least one of the first and second buses BS1 and BS2. Specifically, the bus monitor circuit 30 performs a monitor operation for monitoring the first bus BS1 or BS2 with use of the first physical layer circuit 11 or 12. More specifically, this is a monitor operation for monitoring the state of the first bus BS1 or the second bus BS2 based on signals from the first physical layer circuit 11 or the second physical layer circuit 12. The bus switch circuit 40 then switches on or off the connection between the first and second buses BS1 and BS2 based on the monitor result from the bus monitor circuit 30. For example, based on the monitor result from the bus monitor circuit 30, the bus switch circuit 40 switches on the connection between the first and second buses BS1 and BS2 in the first period T1, and switches off this connection in the second period T2. Also, the processing circuit 20 performs transfer processing shown in FIG. 7 in the second period T2. Accordingly, predetermined signal processing such as packet bit resynchronization processing is executed by the processing circuit 20. That is, packet repeat processing is performed. With this, it is possible to realize high-quality signal transfer that improves degraded signal characteristics of USB transmission signals.

Also, as shown in FIG. 3, the first physical layer circuit 11 includes a disconnection detection circuit 93 on the first bus side that detects the disconnection of a device on the first bus BS1. The disconnection detection circuit 93 is used in detecting the disconnection of a device on the first bus BS1. Hereinafter, the disconnection detection circuit 93 on the first bus side simply referred to as the disconnection detection circuit 93, as appropriate. The disconnection detection circuit 93 performs device disconnection detection in the case where a device connected to the first bus BS1 is detached so as to be disconnected from the first bus BS1. This device disconnection detection can be realized by detecting the amplitudes of the DP and DM signals on the first bus BS1. For example, device disconnection can be detected by detecting the signal amplitude of an EOP in the repeat packet of an SOF packet.

When the connection between the first and second buses BS1 and BS2 is off, if device disconnection is detected by the disconnection detection circuit 93, the bus switch circuit 40 switches the connection between the first and second buses BS1 and BS2 from off to on after the wait period has elapsed from the timing at which device disconnection was detected. Specifically, when the disconnection detection circuit 93 has detected device disconnection, the processing circuit 20 stops transfer processing, and the bus switch circuit 40 switches the connection between the first and second buses BS1 and BS2 from off to on after the wait period has elapsed from the timing at which device disconnection was detected.

For example, previously-mentioned FIG. 2 shows an example of the case where the first bus BS1 is the bus on the upstream side, and the second bus BS2 is the bus on the downstream side. Specifically, in FIG. 1, the circuit device 10 of this embodiment is provided between the main controller 200 that is the host and the portable terminal device 250 that is the device. Also, the main controller 200 is connected to the first bus BS1 on the upstream side, and the portable terminal device 250 is connected to the second bus BS2 on the downstream side.

In this way, in the case where the second bus BS2 is on the downstream side, it is sufficient that the disconnection detection circuit 94 is provided only on the second bus BS2 side, which is the upstream side as shown in FIG. 2. This is because device disconnection detection is performed on the downstream side. However, with CarPlay or USB OTG, the role of the host, which is a master, and the role of the device, which is a slave, can be interchanged, as will be described later. Accordingly, in FIG. 1, there are cases where the portable terminal device 250 plays the role of the host, and the main controller 200 plays the role of the device. In such a case, the first bus BS1 is on the downstream side, and the device disconnection detection needs to be performed on the first bus BS1 side.

In view of this, in FIG. 3, in addition to the disconnection detection circuit 94 on the second bus BS2 side, the disconnection detection circuit 93 is provided on the first bus BS1 side as well. Accordingly, even if the roles of the host and the device are interchanged, and the first bus BS1 is on the downstream side, for example, it is possible to appropriately detect the disconnection of a device from the first bus BS1. Accordingly, it is possible to provide a circuit device 10 that is appropriate for a system in which the roles of the host and the device can be interchanged, for example.

Also, in FIG. 3, the first physical layer circuit 11 includes a first upstream port detection circuit 91 that detects whether or not the first bus BS1 is the bus on the upstream side. The upstream side is an upstream port side. The second physical layer circuit 12 includes a second upstream port detection circuit 92 that detects whether or not the second bus BS2 is the bus on the upstream side. The first and second upstream port detection circuits 91 and 92 respectively detect whether or not the first and second buses BS1 and BS2 are on the upstream side based on an SOF packet or the like received from the first and second buses BS1 and BS2.

If it was determined that the first bus BS1 is the bus on the upstream side, the disconnection detection circuit 94 performs device disconnection detection with respect to the second bus BS2. Specifically, if the first bus BS1 is on the upstream side, then the second bus BS2 is on the downstream side, and therefore the disconnection detection circuit 94 on the second bus BS2 side detects the disconnection of a device on the second bus BS2. The downstream side is a downstream port side. On the other hand, if it was determined that the second bus BS2 is the bus on the upstream side, the disconnection detection circuit 93 performs device disconnection detection with respect to the first bus BS1. Specifically, if the second bus BS2 is on the upstream side, then the first bus BS1 is on the downstream side, and therefore the disconnection detection circuit 93 on the first bus BS1 side detects the disconnection of a device on the first bus BS1.

According to this configuration, in FIG. 1, if the main controller 200 is the USB host, and the portable terminal device 250 is the USB device, for example, the first upstream port detection circuit 91 detects that the first bus BS1 is on the upstream side based on a packet (e.g., an SOF packet) received from the main controller 200. Also, the disconnection detection circuit 94 detects the disconnection of a device from the second bus BS2 that is on the downstream side. On the other hand, if the portable terminal device 250 plays the role of the host, and the main controller 200 plays the role of the device, the second upstream port detection circuit 92 detects that the second bus BS2 is on the upstream side based on a packet (e.g., an SOF packet) received from the portable terminal device 250. Also, the disconnection detection circuit 93 detects the disconnection of a device from the first bus BS1 that is on the downstream side.

Furthermore, the circuit device 10 includes an operation setting circuit 31 that performs operation setting with respect to the disconnection detection circuits 93 and 94. For example, the operation setting circuit 31 is provided in the bus monitor circuit 30. If it was determined that the first bus BS1 is the bus on the upstream side, the operation setting circuit 31 sets the disconnection detection circuit 94 on the second bus BS2 side to an operation enabled state. For example, if the first upstream port detection circuit 91 detects that the first bus BS1 is on the upstream side, the operation of the disconnection detection circuit 94 is enabled, and device disconnection detection can be performed with respect to the second bus BS2 that is on the downstream side. For example, if the operation setting circuit 31 of the bus monitor circuit 30 sets an operation enable signal, which is an enabling signal, for the disconnection detection circuit 94 to active, the disconnection detection circuit 94 enters the operation enabled state, which is an enabled state. On the other hand, if it was determined that the second bus BS2 is the bus on the upstream side, the operation setting circuit 31 sets the disconnection detection circuit 93 on the first bus BS1 side to the operation enabled state. For example, if the second upstream port detection circuit 92 detects that the second bus BS2 is on the upstream side, the operation of the disconnection detection circuit 93 is enabled, and device disconnection detection can be performed with respect to the first bus BS1 that is on the downstream side. For example, if the operation setting circuit 31 sets an operation enable signal for the disconnection detection circuit 93 to active, the disconnection detection circuit 93 enters the operation enabled state.

According to this configuration, if it is detected that one of the first and second buses BS1 and BS2 is on the upstream side, the disconnection detection circuit of the other bus that is on the downstream side is set to the operation enabled state, and device disconnection detection can be performed with respect to the other bus.

Also, if it was detected that the first bus BS1 is on the upstream side, the operation setting circuit 31 sets the disconnection detection circuit 93 on the first bus BS1 side to an operation disabled state. According to this configuration, the disconnection detection circuit 93 that does not need to perform device disconnection detection stops operating, thus preventing erroneous detection. Also, if it was detected that the second bus BS2 is on the upstream side, the operation setting circuit 31 sets the disconnection detection circuit 94 on the second bus BS2 side to the operation disabled state. According to this configuration, the disconnection detection circuit 94 that does not need to perform device disconnection detection stops operating, thus preventing erroneous detection. Also, after the first upstream port detection circuit 91 or 92 has detected that the corresponding bus is on the upstream side, or after the connection between the first and second buses BS1 and BS2 has been switched on, the operation setting circuit 31 may set the first and second upstream port detection circuits 91 and 92 to the operation disabled state.

Note that the operation setting circuit 31 sets the operation disabled state or the power saving state by setting the operation disable signal or a power-saving setting signal to active. Also, the operation enabled state is a state in which the device disconnection detection operation of the disconnection detection circuit 93 or 94 is enabled, and the operation disabled state is a state in which the device disconnection detection operation of the disconnection detection circuit 93 or 94 is disabled. Also, the power saving state is a state in which power consumption is lower than that in the normal state in which disconnection detection is performed normally.

Also, if it is determined that the packet received from the first bus BS1 is an SOF packet, the first upstream port detection circuit 91 determines that the first bus BS1 is the bus on the upstream side. Furthermore, if it is determined that the packet received from the second bus BS2 is an SOF packet, the second upstream port detection circuit 92 determines that the second bus BS2 is the bus on the upstream side.

Figure 6:
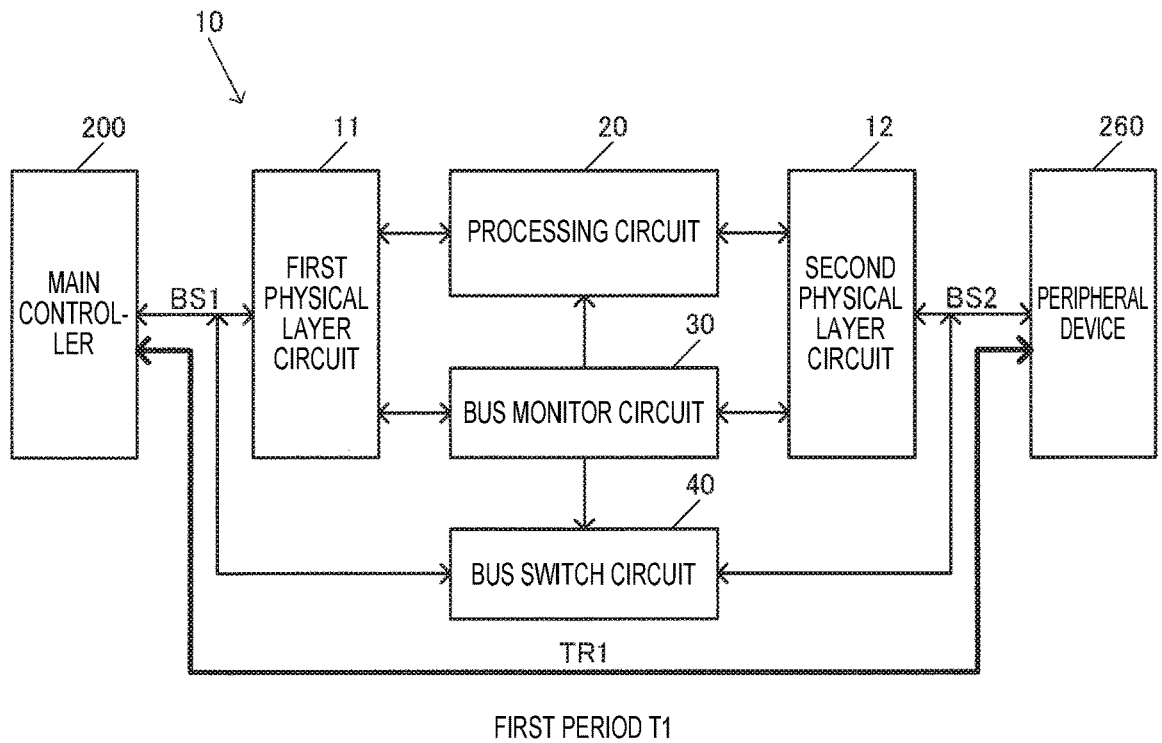
FIG. 6 is an illustrative diagram of operations of the circuit device.

For example, if the first bus BS1 is on the upstream side, in the HS mode, the main controller 200 shown in FIGS. 6 and 7 transmits an SOF packet as the host. In this case, the first upstream port detection circuit 91 on the first bus BS1 side of the circuit device 10 detects that the first bus BS1 is on the upstream side by detecting the SOF packet from the main controller 200. The disconnection detection circuit 94 on the second bus BS2 thus detects device connection with respect to the second bus BS2. On the other hand, if the second bus BS2 is on the upstream side, in the HS mode, the peripheral device 260 transmits an SOF packet as the host. In this case, the second upstream port detection circuit 92 on the second bus BS2 side of the circuit device 10 detects that the second bus BS2 is on the upstream side by detecting the SOF packet from the peripheral device 260. The disconnection detection circuit 94 on the first bus BS1 side thus detects device connection with respect to the first bus BS1. According to this configuration, by using an SOF packet received from the host side, it is possible to appropriately detect whether or not the bus is on the upstream. The SOF packet is periodically received from the host side, and therefore is suitable as a signal for detecting whether the bus is on the upstream. It should be noted that a configuration is possible in which whether or not the bus is on the upstream side is detected by detecting another signal that only arrives from the host side, instead of the SOF packet.

Also, if an SOF packet was received from the first bus BS1, the processing circuit 20 performs processing for transmitting a repeat packet corresponding to the SOF packet to the second bus BS2. Specifically, the processing circuit 20 operates as a repeater circuit, and transmits a repeat packet corresponding to the SOF packet to the second bus BS2 side with use of the second physical layer circuit 12. The disconnection detection circuit 94 on the second bus BS2 side then performs device disconnection detection by detecting the signal amplitude of the EOP in the repeat packet corresponding to the SOF packet. Specifically, if it was determined that the first bus BS1 is on the upstream side, and the second bus BS2 is on the downstream physical layer circuit, the disconnection detection circuit 94 performs device disconnection detection by monitoring the signal amplitude of a repeat packet transmitted by the second physical layer circuit 12. For example, the disconnection detection circuit 94 detects device disconnection by detecting whether or not the signal amplitude has exceeded a predetermined threshold value. The predetermined threshold value is a voltage level between 400 mV and 800 mV. According to this configuration, device disconnection can be appropriately detected with use of the EOP field of an SOF packet.

Also, if an SOF packet was received from the second bus BS2, the processing circuit 20 performs processing for transmitting a repeat packet corresponding to the SOF packet to the first bus BS1. The disconnection detection circuit 93 on the first bus BS1 then performs device disconnection detection by detecting the signal amplitude of the EOP in the repeat packet corresponding to the SOF packet. Specifically, the disconnection detection circuit 93 detects device connection by monitoring the signal amplitude of a repeat packet transmitted by the first physical layer circuit 11.

Also, the circuit device 10 of this embodiment includes a timer circuit 32. The timer circuit 32 is provided in the bus monitor circuit 30 in FIG. 3. The timer circuit 32 measures the elapse of the wait period from the timing at which device disconnection was detected. For example, the timer circuit 32 is constituted by a counter, and the count processing of the counter is started when device disconnection is detected. When the count value of the counter reaches a count value corresponding to the wait period, the timer circuit 32 outputs an activated count end signal. When the count end signal is activated, the bus monitor circuit 30 outputs a switching control signal for switching the bus switch circuit 40 from off to on, and with this, the connection between the first bus BS1 and the second bus BS2 is switched from off to on. In this way, as a result of setting the count value corresponding to the wait period to the timer circuit 32, the elapse of the wait period can be measured. Also, the connection between the first bus BS1 and the second bus BS2 can be switched from off to on after the wait period has elapsed from the timing at which device disconnection was detected.

Also, in this embodiment, when the issue interval of the SOF packet is denoted as TSF, the length TW of the wait period satisfies TW>TSF. The issue interval of the SOF packet is TSF=125 µs, for example, and the length TW of the wait period is longer than TSF=125 µs. In this way, the main controller 200 can detect device disconnection by outputting at least one SOF packet during the wait period, which satisfies TW>TSF. That is, the connection of the bus switch circuit 40 is switched off in the wait period, and the processing circuit 20 is set to an operation disabled state, which is a disabled state, and the HS transfer processing in the processing circuit 20 is stopped. Therefore, the main controller 200 can detect device disconnection by transmitting the SOF packet to the first bus BS1.

Also, in this embodiment, it is desirable that TW≥2×TSF. Accordingly, the main controller 200 can detect device disconnection by outputting the SOF packet a plurality of times in the wait period that satisfies TW≥2×TSF. Therefore, the main controller 200 can appropriately detect device disconnection.

Also, the bus monitor circuit 30 outputs a signal for stopping the transfer processing of the processing circuit 20 to the processing circuit 20 when the disconnection detection circuit 94 or the like detected device disconnection. Then, the bus monitor circuit 30 outputs to the bus switch circuit 40 a signal for switching the connection between the first bus BS1 and the second bus BS2 from off to on, after the wait period has elapsed from the timing at which device disconnection was detected. As a result of the bus monitor circuit 30 outputting a signal for stopping HS transfer processing when device disconnection is detected, the HS termination in the first physical layer circuit 11 is disabled. For example, the output of an FS driver enters a high impedance state. Therefore, the main controller 200 can detect device disconnection by transmitting the SOF packet to the first bus BS1.

Figure 4:
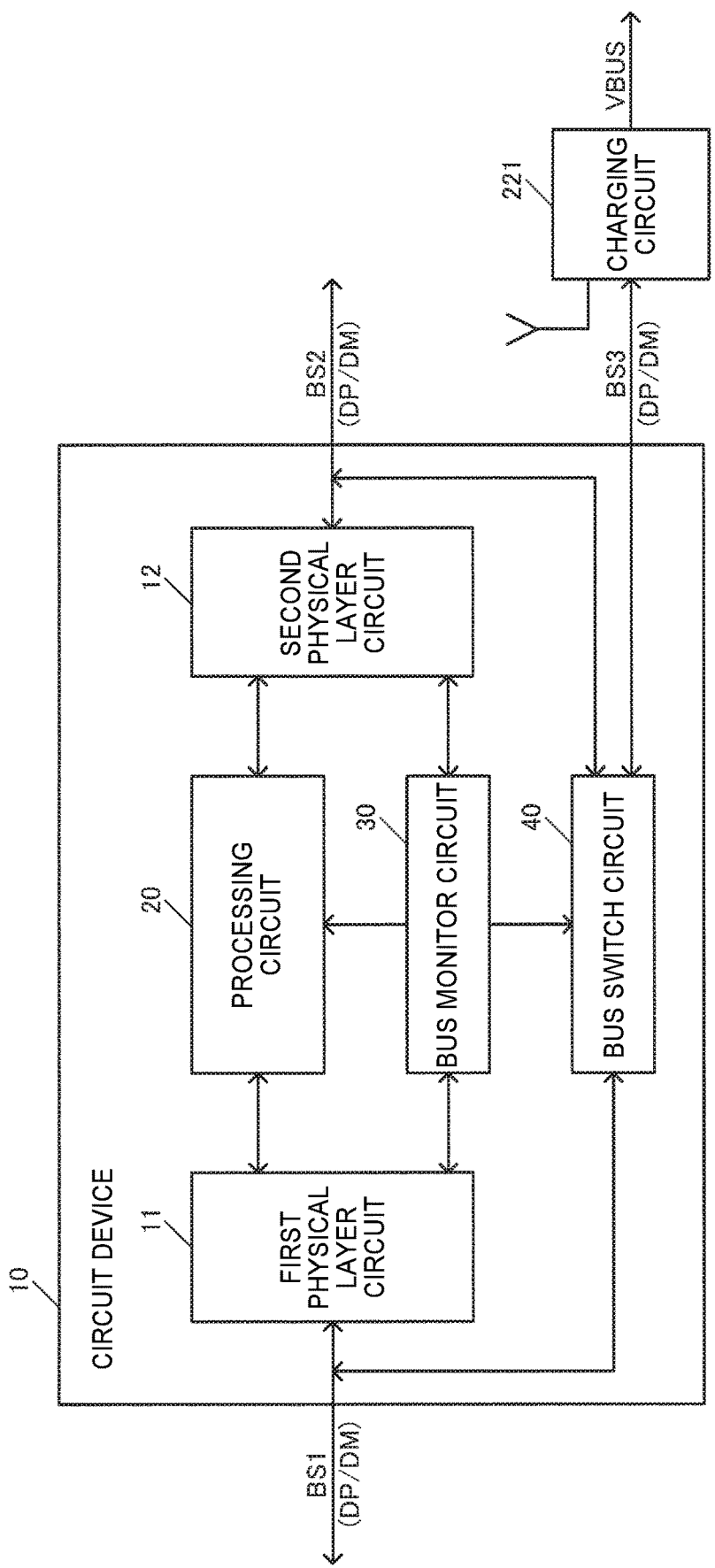
FIG. 4 shows an exemplary configuration of the circuit device in the case where a charging circuit is connected.

FIG. 4 shows an exemplary configuration of the circuit device 10 of when a charging circuit 221 is connected. The charging circuit 221 is a circuit that operates in compliance with the USB BC 1.2 (Battery Charging Specification Rev 1.2) specification for example. In BC 1.2, the power supply limit of VBUS, which is 500 mA or less for example, is extended to 2 A or less for example. In FIG. 4, the charging circuit 221 has a regulator circuit or the like, and receives external power and supplies power to VBUS. Also, although it has only been possible to supply power from the master side to the slave side, in BC 1.2, power can also be supplied from the slave side to the master side. For example, even in the case where the peripheral device 260 plays the role of the master, which is a host, and the main controller 200 plays the role of the slave, which is a device, VBUS power can be supplied from the main controller 200 that is the slave to the peripheral device 260 that is the master.

In order to realize BC 1.2, the charging circuit 221 needs to execute a BC 1.2 protocol by transferring signals to the peripheral device 260 using DP and DM in a charging arbitration period. For this reason, as will be described later with reference to FIG. 9, in the charging arbitration period, which is a BC 1.2 protocol execution period, the bus switch circuit 40 switches on the connection between the second bus BS2 and a third bus BS3 to which the charging circuit 221 is connected. For example, if a switch element provided between the third bus BS3 and the second bus BS2 is switched on, the charging circuit 221 can transfer signals to the peripheral device 260 using DP and DM. According to this configuration, in the charging arbitration period, charging arbitration processing can be performed by executing the BC 1.2 protocol. For example, it is possible to set an appropriate charging current, and therefore the charging speed can be raised.

Figure 5:
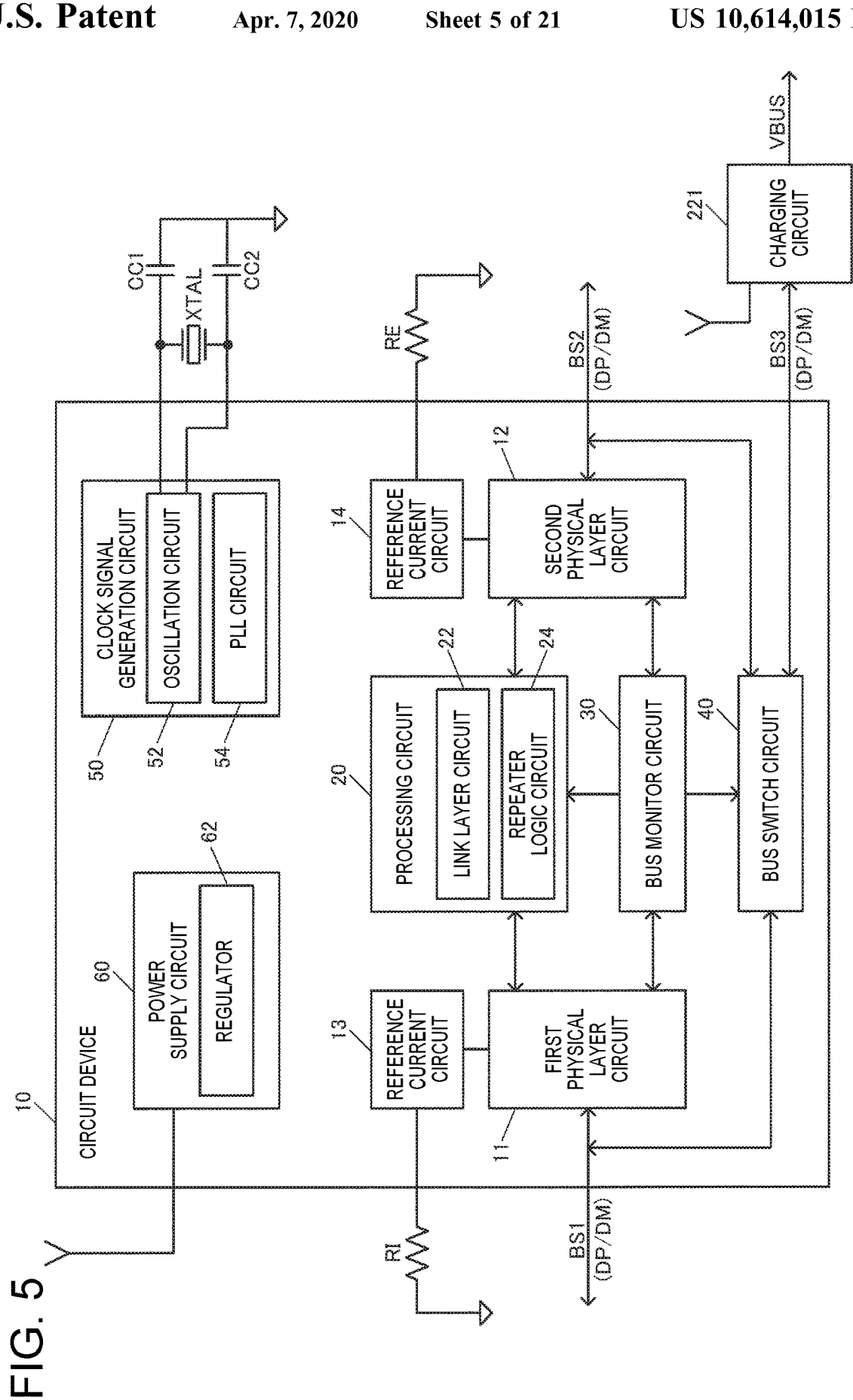
FIG. 5 shows a specific exemplary configuration of the circuit device.

FIG. 5 shows a specific exemplary configuration of the circuit device 10. In FIG. 5, the circuit device 10 further includes reference current circuits 13 and 14, a clock signal generation circuit 50, and a power supply circuit 60. The reference current circuits 13 and 14 are circuits for generating reference currents used in the first and second physical layer circuits 11 and 12 respectively, and generate the reference currents with use of resistors RI and RE that are external components. The clock signal generation circuit 50 is a circuit that generates various types of clock signals used in the circuit device 10, and includes an oscillation circuit 52 and a PLL circuit 54. The oscillation circuit 52 is connected to an oscillator XTAL and capacitors CC1 and CC2, which are external components. The oscillator XTAL is realized by a quartz resonator or the like. The oscillator XTAL performs an oscillation operation, and the oscillation circuit 52 generates clock signals based on the oscillation signal. The PLL circuit 54 generates a multiphase clock signal based on a generated clock signal. The power supply circuit 60 receives voltage from an external power supply, and generates various types of power supply voltages for use in the circuit device 10. Specifically, a regulator 62 of the power supply circuit 60 regulates the voltage from the external power supply, generates power supply voltage having a lower voltage than the voltage from the external power supply, and supplies the generated power supply voltage to various circuit blocks of the circuit device 10.

The processing circuit 20 includes a link layer circuit 22, a repeater logic circuit 24, and the like. The link layer circuit 22 is a circuit that performs processing that corresponds to the link layer. The link layer circuit 22 performs serial-to-parallel conversion processing for converting serial data received via USB into parallel data, parallel-to-serial conversion processing for converting parallel data into serial data for transmission, processing for NRZI encoding and decoding, and the like. The repeater logic circuit 24 performs logic processing for transmitting packets received from the first bus BS1 side to the second bus BS2 side, and transmitting packets received from the second bus BS2 side to the first bus BS1 side. For example, the bits of a received packet are sampled using a clock signal, and serial data obtained by the sampling is converted into parallel data. Also, parallel data that has been subjected to various types of logic processing such as NRZI is converted into serial data and transmitted in synchronization with a clock signal in the circuit device 10. According to this configuration, predetermined signal processing such as packet bit resynchronization processing (resynchronization) is realized.

Figure 8:
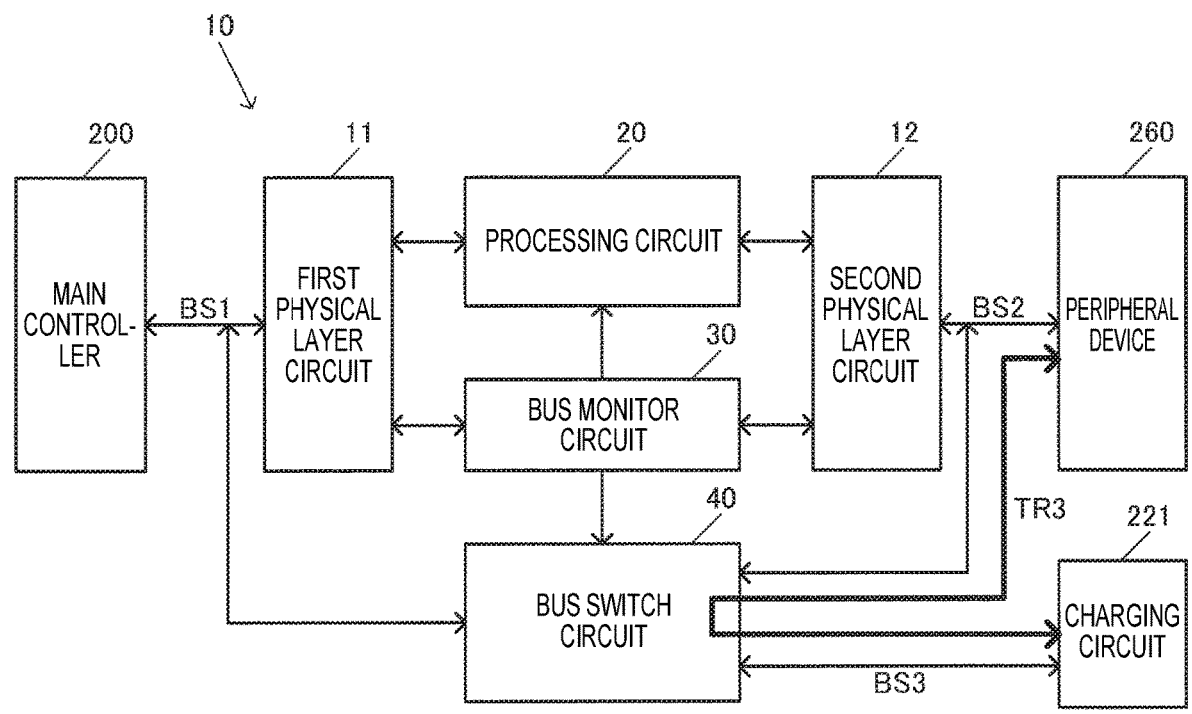
FIG. 8 is an illustrative diagram of operations of the circuit device.

FIGS. 6, 7, and 8 are illustrative diagrams of operations of the circuit device 10 of this embodiment. As shown in FIG. 6, in the first period T1, the bus switch circuit 40 switches on the connection between the first and second buses BS1 and BS2. For example, when a switching control signal from the bus monitor circuit 30 becomes active, switch elements respectively provided in correspondence with the DP and DM signal lines are switched on, and the first and second buses BS1 and BS2 become electrically connected. Accordingly, the main controller 200 connected to the first bus BS1 and the peripheral device 260 connected to the second bus BS2 are able to perform USB signal transfer on the transfer route TR1 that includes the first bus BS1, the bus switch circuit 40, and the second bus BS2. In other words, it is possible to perform signal transfer with use of the signals DP and DM. On the other hand, as shown in FIG. 7, in the second period T2 after the first period T1, the bus switch circuit 40 switches off the connection between the first and second buses BS1 and BS2. For example, when a switching control signal from the bus monitor circuit 30 becomes inactive, switch elements respectively provided in correspondence with the signals DP and DM are switched off, and the first and second buses BS1 and BS2 become electrically disconnected. In this second period T2, the processing circuit 20 performs transfer processing for transferring packets between the first and second buses BS1 and BS2 via the first and second physical layer circuits 11 and 12. In other words, packet transfer processing is performed on the transfer route TR2. For example, in the second period T2, when a transfer processing instruction signal from the bus monitor circuit 30 becomes active, the processing circuit 20 starts packet transfer processing on the transfer route TR2. In this transfer processing, predetermined signal processing such as packet bit resynchronization processing is performed, and an improvement in signal quality is realized.

FIG. 8 is an illustrative diagram of operations of the circuit device 10 according to the configuration example shown in FIG. 4. In FIG. 8, in the charging arbitration period, the bus switch circuit 40 switches on the connection between the second bus BS2 and the third bus BS3 that is connected to the charging circuit 221. For example, switch elements respectively provided in correspondence with the signals DP and DM between the buses BS3 and BS2 are switched on in the charging arbitration period, and the third bus BS3 and the second bus BS2 become electrically connected. Accordingly, the BC 1.2 protocol for example is executed between the charging circuit 221 and the peripheral device 260 for example, and charging arbitration processing or the like is realized. After this charging arbitration period, a switch to the first period T1 in FIG. 6 is performed, and signal transfer is performed on the transfer route TR1. Thereafter, a switch to the second period T2 in FIG. 7 is performed, and packet transfer processing is performed on the transfer route TR2.

As described above, in this embodiment, the circuit device 10 is provided with the processing circuit 20 that performs packet transfer between the first and second buses BS1 and BS2 via the first and second physical layer circuits 11 and 12, the bus monitor circuit 30 that monitors the buses, and the bus switch circuit 40 that switches on and off the connection between the first and second buses BS1 and BS2 based on the monitor result. According to this configuration, even if the signal characteristics of signals on the first and second buses BS1 and BS2 has degraded for example, degraded signal characteristics can be improved by performing predetermined signal processing such as packet bit resynchronization processing on the transfer route TR2 in FIG. 7.

For example, if the cable 224 is long as shown in FIG. 1, or a large parasitic capacitance or parasitic resistance exists on the transfer route, there is a problem that the signal characteristics degrade a large amount, and appropriate signal transfer cannot be realized. In view of this, if the circuit device 10 of this embodiment is arranged between the main controller 200 and the portable terminal device 250, which is a peripheral device 260, it is possible to improve the degraded signal characteristics. Accordingly, it is possible to realize appropriate signal transfer between the main controller 200 and the portable terminal device 250.

Also, in this embodiment, the states of the first and second buses BS1 and BS2 are monitored by the bus monitor circuit 30, and the connection between the first and second buses BS1 and BS2 is switched on and off by the bus switch circuit 40 based on the monitor result. Accordingly, in the first period T1, which is before high-speed packet transfer in the HS mode is performed for example, the first and second buses BS1 and BS2 can be electrically connected by the bus switch circuit 40 as shown in FIG. 6. Accordingly, in this first period T1, signal transfer can be performed with use of the signals DP and DM between the main controller 200 and the peripheral device 260, and various types of exchanges can be performed prior to HS mode packet transfer. Then, in the second period T2, as shown in FIG. 7, the connection between the first and second buses BS1 and BS2 is switched off, and HS mode packet transfer is performed on the transfer route TR2. During this packet transfer, packet bit resynchronization is performed, thus making it possible to realize high-quality packet transfer that improves degraded signal characteristics as described with reference to FIG. 1.

Note that the USB-HUB 210 shown in FIG. 1 has a product ID and a vender ID in accordance with the USB standard. In contrast, the circuit device 10 of this embodiment does not have such a product ID or vender ID, and the circuit device 10 of this embodiment is different from the USB-HUB 210 in this respect.

Also, as a circuit device for improving degraded signal characteristics, there is also a circuit device called a redriver that uses an analog circuit to perform amplitude adjustment and eye adjustment for the signals DP and DM. However, a redriver does not perform packet transfer on the transfer route TR2 shown in FIG. 7, and therefore cannot improve the signal characteristic of degraded signals with resynchronization processing, and thus is different from the circuit device 10 of this embodiment in this respect.

Also, the peripheral device 260 in FIGS. 6 to 8 may be able to switch between the role of the host and the role of the device, as with CarPlay and USB OTG (On-The-GO). For example, assume that the portable terminal device 250 in FIG. 1 is the peripheral device 260 that can perform CarPlay or the like. In this case, a technique is conceivable in which a USB-HUB for improving degraded signal characteristics is arranged between the main controller 200 and the peripheral device 260. However, in the case where the peripheral device 260 is the host, the host peripheral device 260 is connected to the downstream port of the USB-HUB, and there is a problem that appropriate packet transfer cannot be realized. In view of this, the circuit device 10 of this embodiment has an advantage in that, unlike the USB-HUB, even in the case where the role of the peripheral device 260 connected to the second bus BS2 in FIGS. 6 to 8 for example is switched to the role of the host, it is possible to handle this case. For example, it is sufficient that switch processing and setting processing regarding the host and device roles is performed in the first period T1. After it has been determined that the role of the peripheral device 260 is the host or the device, it is sufficient to perform packet transfer on the transfer route TR2 as shown in FIG. 7 in the second period T2. Accordingly, with the technique of this embodiment, there is an advantage that even if the peripheral device 260 is a CarPlay device for example, it is possible to realize appropriate packet transfer.

Figure 9:
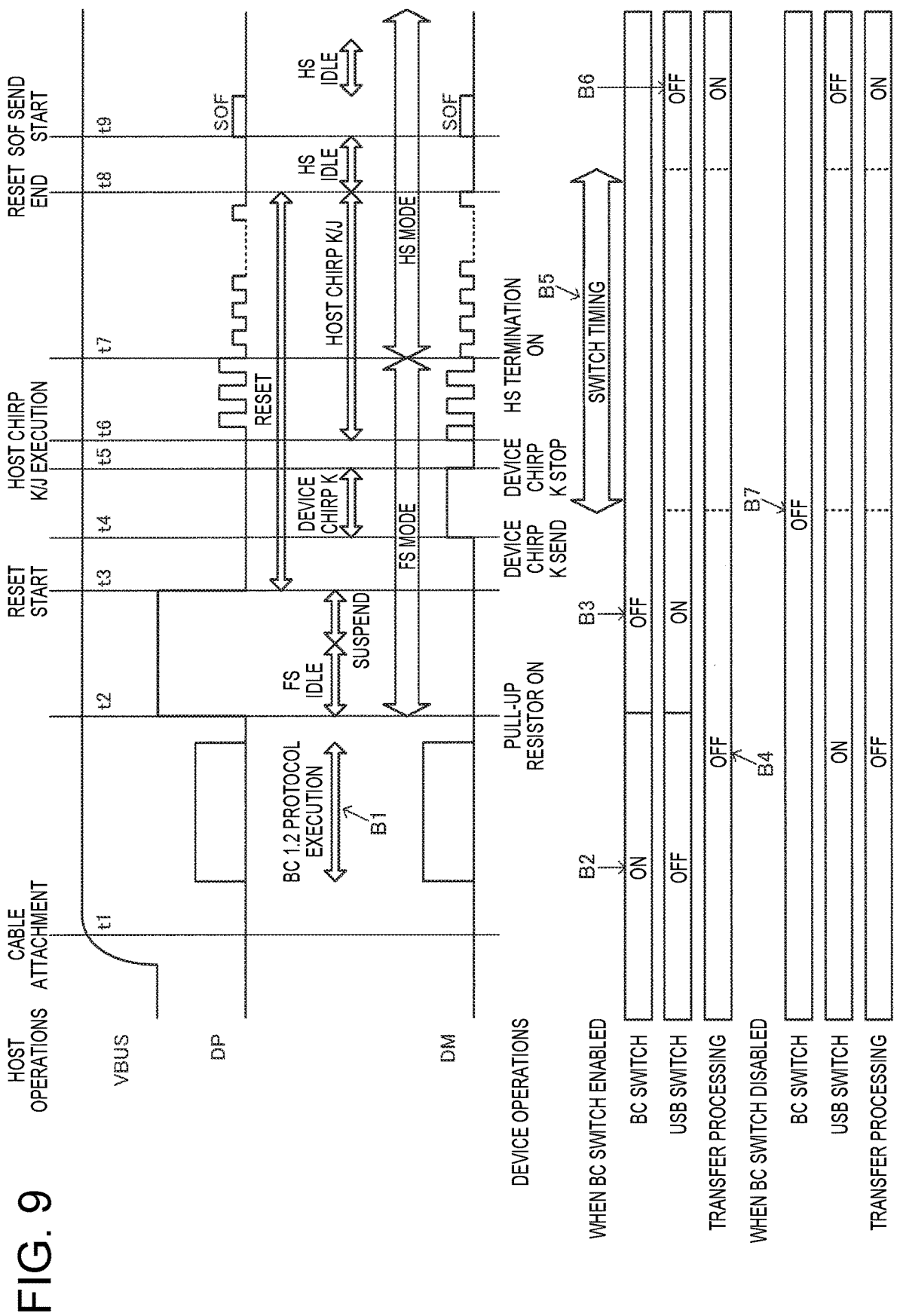
FIG. 9 is a signal waveform diagram illustrating detailed operations of the circuit device.

Next, a detailed operation example of this embodiment will be described. FIG. 9 is a signal waveform diagram showing a USB operation sequence after cable attachment. In FIG. 9, the BC switch and the USB switch are switch elements provided in the bus switch circuit 40. The BC switch is a switch element that is provided between the third bus BS3 and the second bus BS2 in the bus switch circuit 40. The USB switch is a switch element that is provided between the first bus BS1 and the second bus BS2 in the bus switch circuit 40. Meanwhile, ON and OFF in transfer processing indicates whether transfer processing on the transfer route TR2 in FIG. 7 is on or off.

After cable attachment (timing t1), the previously-described BC 1.2 protocol is executed. The period in which the BC 1.2 protocol is executed (denoted by B1) is the charging arbitration period. Next, when the device side, which is the peripheral device 260, switches on a pull-up resistor, the voltage of the signal DP is pulled up, and a shift to the FS mode is performed (t2). In other words, a shift to FS idle is performed, and if nothing happens for a certain time, a shift to the suspend state is performed. Next, when the host side, which is the main controller 200, starts a reset (t3), the voltage of the pulled-up signal DP falls to L level. This is detected by the device side, and the device side transmits a device chirp K (t4). Thereafter, when a certain time has elapsed, the device side stops the transmission of the device chirp K (t5). Accordingly, the host side executes host chirp K/J (t6). By detecting the host chirp K/J, the device side recognizes that the host side is compatible with the HS mode, and switches on HS termination (t7). Accordingly, the amplitude of the signals DP and DM is reduced to 400 mV, and a shift to the HS mode is performed. When the host side ends the reset (t8), a shift to HS idle is performed, and the host side starts SOF transmission (t9).

In this embodiment, the BC switch that connects the third bus BS3 and the second bus BS2 can be set to enabled or disabled. If the BC switch has been set to enabled, in the BC 1.2 protocol execution period indicated by B1 in FIG. 9, the BC switch is switched on and the USB switch is switched off as indicated by B2. For example, in FIG. 8, when the BC switch is on, the connection between the buses BS3 and BS2 is switched on, and the USB switch is switched off, and therefore the connection between the first and second buses BS1 and BS2 is switched off. Accordingly, signal processing for charging arbitration or the like using the signals DP and DM can be performed between the charging circuit 221 and the peripheral device 260.

When a shift to the FS mode is performed, the USB switch is switched on, and the BC switch is switched off, as indicated by B3. When the USB switch is switched on, the connection between the first and second buses BS1 and BS2 is switched on, and when the BC switch is switched off, the connection between the buses BS3 and BS2 is switched off. Accordingly, signal transfer on the transfer route TR1, in FIG. 6, using the signals DP and DM can be performed between the main controller 200 and the peripheral device 260. At this time, transfer processing on the transfer route TR2 shown in FIG. 7 is off, as indicated by B4.

Also, in this embodiment, the switch timing for switching on/off the connection between the first and second buses BS1 and BS2 is set to a timing in the range indicated by B5 in FIG. 9. Specifically, the connection between the first and second buses BS1 and BS2 is switched from on to off at least after the device chirp K start timing (t4). That is, the connection is switched from the first period T1 to the second period T2. Alternatively, the connection between the first and second buses BS1 and BS2 is switched from on to off at least after the host chirp K/J end timing (t8). For example, at a timing that is at least after the device chirp K start timing (t4) for example and also before the SOF transmission start timing (t9), the connection between the first and second buses BS1 and BS2 is switched from on to off, and transfer processing on the transfer route TR2 is switched from off to on. Note that if the BC switch has been set to disabled, the switching on/off of the BC switch indicated by B2 and B3 is not performed, and the BC switch remains off as indicated by B7.

In this way, in this embodiment, in the first period T1 indicated by B3, the USB switch is switched on, and the connection between the first and second buses BS1 and BS2 is switched on. Signal transfer on the transfer route TR1 is performed between the main controller 200 and the peripheral device 260. On the other hand, in the second period T2 indicated by B6, the USB switch is switched off, the connection between the first and second buses BS1 and BS2 is switched off, and transfer processing performed by the processing circuit 20 is switched on, and therefore packet transfer is performed on the transfer route TR2. Note that the switch timing is a timing in the range indicated by B5, and therefore in FIG. 9, the ranges of the USB switch on/off switch timing and the transfer processing on/off switch timing are indicated by dashed lines.

Also, in this embodiment, at least after the device chirp K start timing (t4), the bus switch circuit 40 switches the connection between the first and second buses BS1 and BS2 from on to off, and the processing circuit 20 starts transfer processing on the transfer route TR2. For example, after the device chirp K start timing, the USB switch is switched from on (B3) to off (B6), and the transfer processing performed by the processing circuit 20 is switched from off (B4) to on (B6). Specifically, if the start of device chirp K (t4) is detected, it can be determined that the device side is compatible with the HS mode. However, it is very rare that the host side is not compatible with the HS mode. For this reason, if the start of device chirp K (t4) is detected, it is possible to switch the USB switch from on to off, and switch HS mode transfer processing performed by the processing circuit 20 from off to on. Accordingly, it is sufficient that the switch timing in the range indicated by B5 is a timing that is at least after the device chirp K start timing (t4).

Alternatively, in consideration also of the possibility that the host side is not compatible with the HS mode, a configuration is possible in which if the start of host chirp K/J (t6) is detected, the USB switch is switched from on to off, and HS mode transfer processing performed by the processing circuit 20 is switched from off to on. For example, in this embodiment, a configuration is possible in which at least after the host chirp K/J end timing (t8), the bus switch circuit 40 switches the connection between the first and second buses BS1 and BS2 from on to off, and the processing circuit 20 starts transfer processing on the transfer route TR2. According to this configuration, if, for example, it is determined that the host side and the device side are both compatible with the HS mode, and it is determined that the switch to the HS mode is complete, then it is possible to thereafter appropriately start transfer processing performed by the processing circuit 20. In this way, it is sufficient that the switch timing in the range indicated by B5 is at least after the device chirp K start timing. It should be noted that the negative influence of a glitch from switching also needs to be taken into consideration. Accordingly, it is desirable that the switch timing is in a period in which the signals DP and DM have been set to a predetermined voltage level such as an L level. Examples include the period from timings t5 to t6 and the period from t8 to t9 in FIG. 9.

As described above, in this embodiment, before the switch timing indicated by B5 in FIG. 9, the USB switch is switched on as indicated by B3, and therefore signals can be exchanged on the USB bus between the host side and the device side. The bus monitor circuit 30 monitors the exchange of signals on the USB bus. If device chirp K or host chirp K/J is detected for example, it is determined that HS mode transfer is possible, and thus the USB switch is switched from on to off, and transfer processing performed by the processing circuit 20 is switched from off to on. Accordingly, it is possible to appropriately shift to HS mode transfer processing after the exchange of signals between the host side and the device side.

Figure 10:
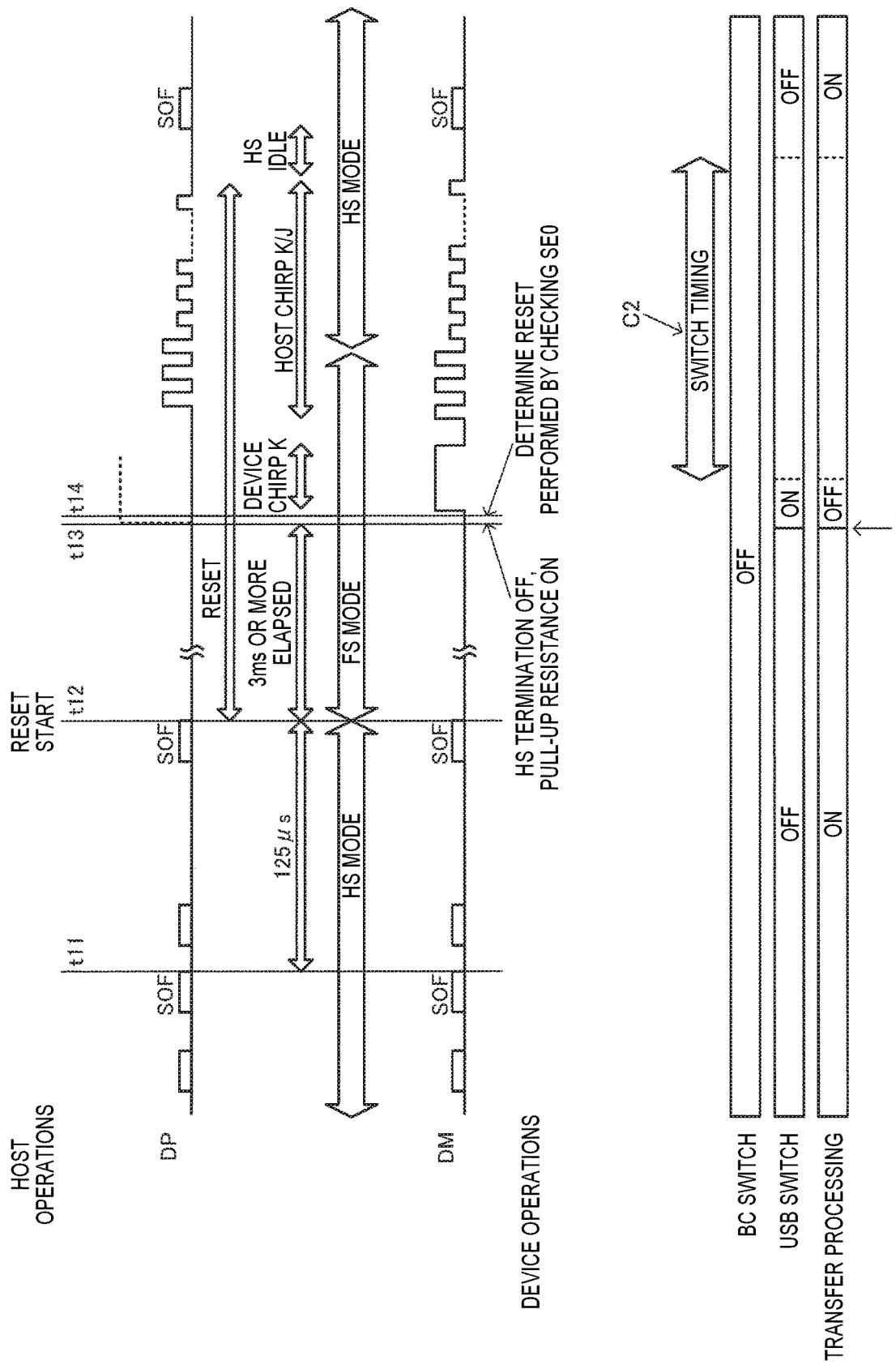
FIG. 10 is a signal waveform diagram illustrating detailed operations of the circuit device.

FIG. 10 is a signal waveform diagram showing an operation sequence after a reset is performed in HS mode transfer. In the HS mode, the host side transmits an SOF packet every 125 μs (t11, t12). If the host side starts a reset (t12), a shift to the FS mode is performed, and if a state where no packet is on the bus has continued for 3 ms or more, the device side switches off HS termination, and switches on the pull-up resistor (t13). On the device side, it is confirmed that the bus state is SE0 (t14), and therefore it is determined that a reset was started, and a device chirp K is transmitted. In response to this, the host side transmits a host chirp K/J, and a shift from the FS mode to the HS mode is performed.

As shown by C1 in FIG. 10, in this embodiment, if the host starts a reset, the USB switch is switched from off to on, and transfer processing performed by the processing circuit 20 is switched from on to off. In other words, if a reset is performed by the host, the bus switch circuit 40 switches the connection between the first and second buses BS1 and BS2 from off to on, and the processing circuit 20 stops performing transfer processing. According to this configuration, if a reset is performed during HS mode transfer for example, the first and second buses BS1 and BS2 become electrically connected, and signal transfer can be performed using the signals DP and DM between the main controller 200 and the peripheral device 260 for example. Thereafter, at a switch timing in the range indicated by C2 in FIG. 10 for example, the USB switch is switched from on to off, and transfer processing performed by the processing circuit 20 is switched from off to on. Accordingly, it is possible to appropriately shift to HS mode transfer processing after the exchange of signals between the host side and the device side.

Figure 11:
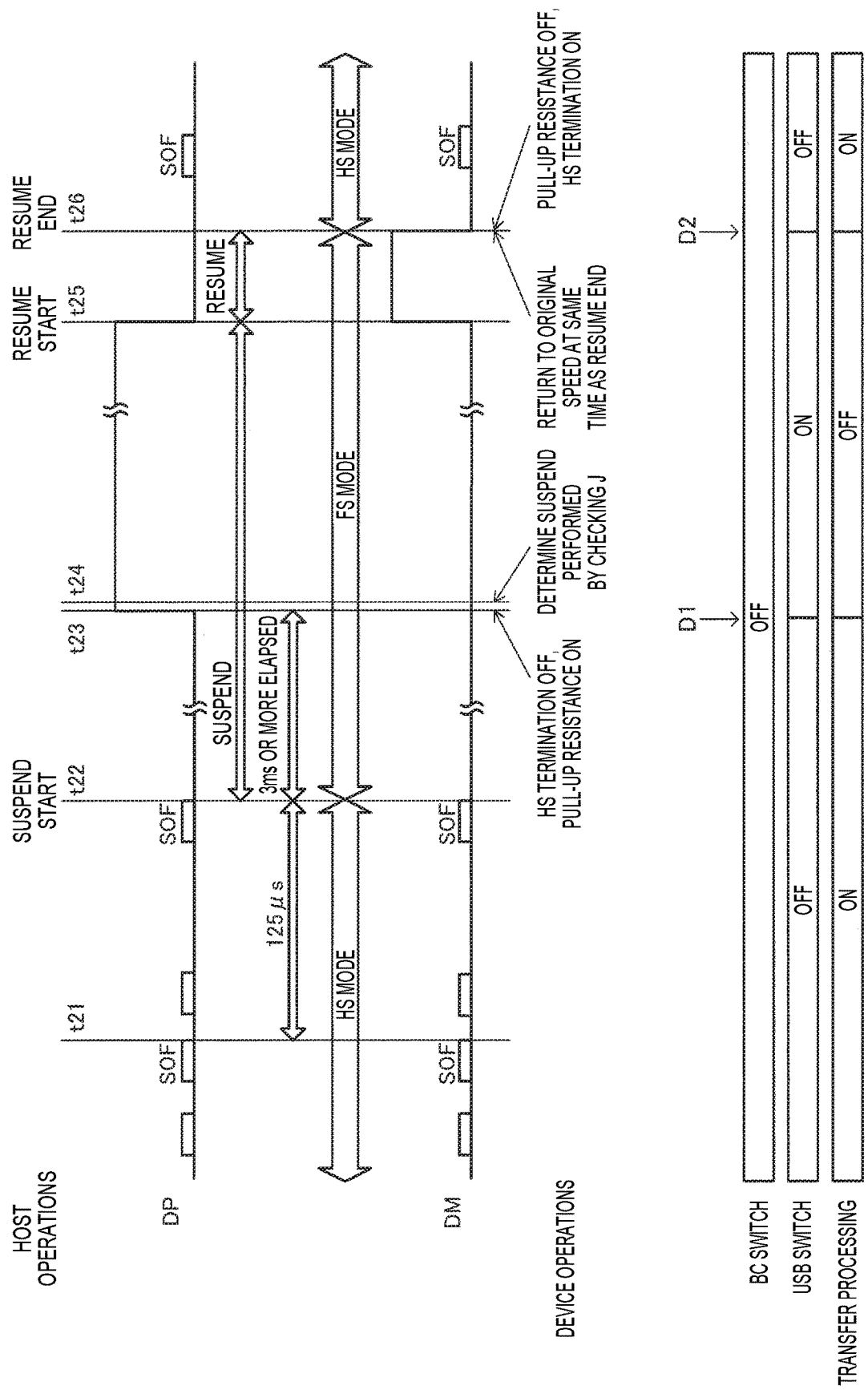
FIG. 11 is a signal waveform diagram illustrating detailed operations of the circuit device.

FIG. 11 is a signal waveform diagram showing an operation sequence in the case of a shift from HS mode transfer to suspend and a shift to resume. If the host side starts a suspend (t22), a shift to the FS mode is performed, and if a state where no packet is on the bus has continued for 3 ms or more, the device side switches off HS termination, and switches on the pull-up resistor (t23). Then, on the device side, it is confirmed that the state of the bus is J (t24), and therefore it is determined that a suspend has started. Then the host side starts a resume (t25), and when the resume ends (t26), at the same time as the end of the resume, the device side returns to the mode that was realized prior to the suspend. Then the pull-up resistor is switched off, the HS termination is switched on, and the mode returns to the HS mode. As shown by D1 in FIG. 11, in this embodiment, even if the host starts a suspend, the USB switch is switched from off to on, and transfer processing performed by the processing circuit 20 is switched from on to off. In other words, if a suspend is performed by the host, the bus switch circuit 40 switches the connection between the first and second buses BS1 and BS2 from off to on, and the processing circuit 20 stops performing transfer processing. According to this configuration, if a suspend is performed during HS mode transfer, the first and second buses BS1 and BS2 become electrically connected, and signal transfer can be performed using the signals DP and DM between the main controller 200 and the peripheral device 260 for example. Then, after the suspend, the host side performs a resume, and therefore, as indicated by D2 in FIG. 11, the USB switch is switched from on to off, and the transfer processing performed by the processing circuit 20 is switched from off to on. Accordingly, by performing a resume after a suspend, HS mode data transfer can be appropriately resumed. Note that the operation sequence of a shift from suspend to reset is similar to the operation sequence of a shift from suspend to reset after a shift from cable attachment to FS idle.

3. Details of Circuit Device

Figure 12:
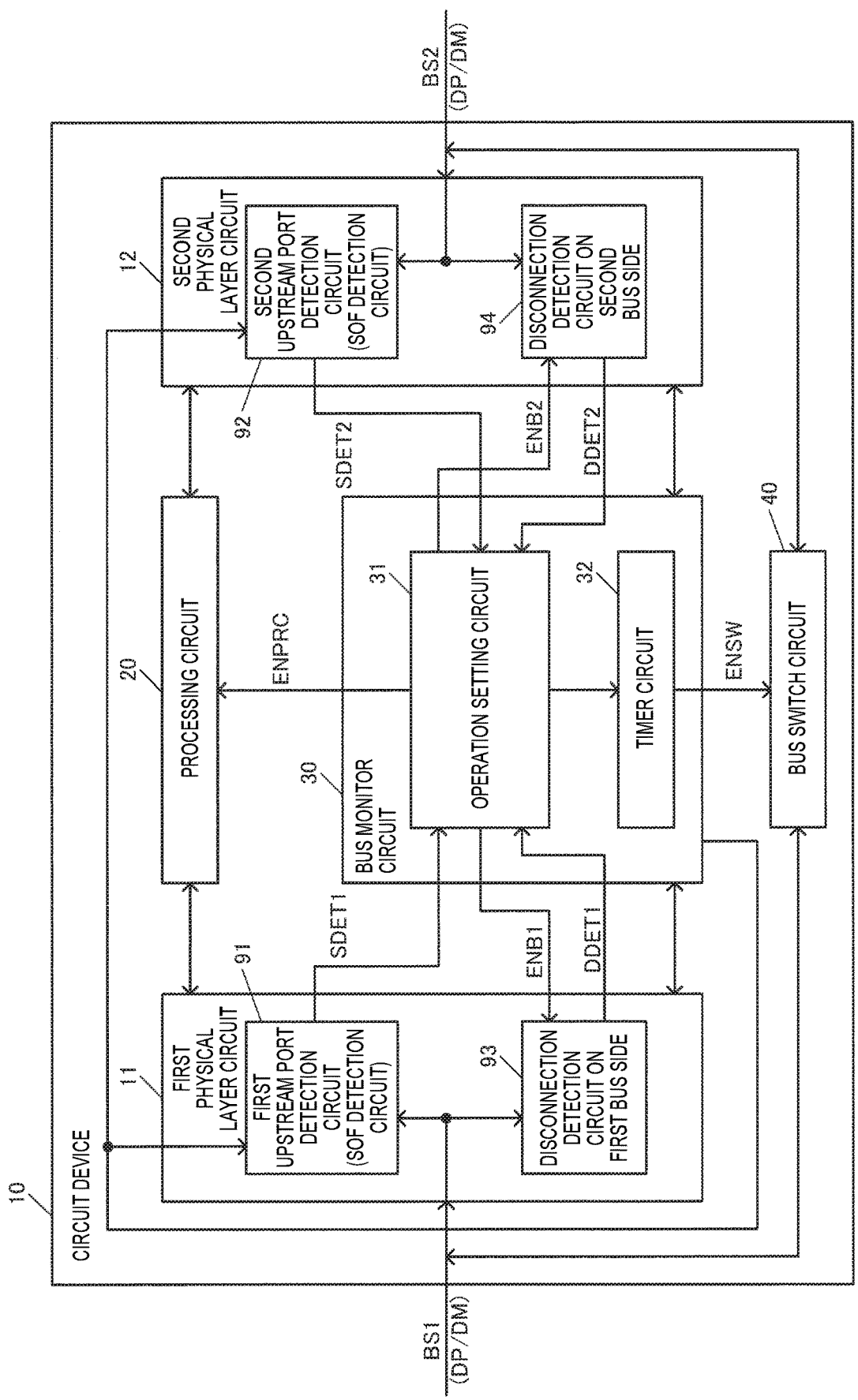
FIG. 12 is a detailed exemplary configuration of the circuit device.

Next, details of the circuit device 10 of this embodiment will be described with reference to FIG. 12, and the like. In this embodiment, at the timing indicated by C1 in FIG. 10, a switch is performed from the transfer route TR2 that passes through the processing circuit 20 to the transfer route TR1 that passes through the bus switch circuit 40. If the host and the device are connected to the first and second buses BS1 and BS2, operations can be performed without a problem when the transfer route is switched at this timing, but a problem occurs if the device is detached and a disconnected state arises. For example, if the device is disconnected during the execution of a device chirp (t4 to t5) in FIG. 9, the length of the device chirp will not meet the desired time (1 ms), and therefore the host can detect the disconnection of the device. Also, if the device is disconnected during the execution of a host chirp (t6 to t8), the signal level of the host chirp will not reach a desired signal level (400 mV), and therefore the host can detect the disconnection of the device. However, if the device is disconnected after the end of a chirp (after t8), the host cannot detect the disconnection of the device. This is because after the end of the chirp, an HS connection is established between the host and the processing circuit 20, and therefore a change in waveform does not appear on the first bus BS1 side due to the device disconnection on the second bus BS2, and thus the host cannot detect the disconnection of the device. Also, after a SE0 state continuing for 3 ms or more has been detected (after t13), the SE0 state is detected again, and if a device chirp is not detected, the host can detect the disconnection of the device.

In this way, after a switch to the transfer route TR2 that passes through the processing circuit 20, when HS mode communication is to be performed, an HS connection is established between the host and the processing circuit 20, and a change does not appear in the HS packet waveform, and therefore even if the device is disconnected, the host cannot detect the disconnection. A technique is conceivable in which the host issues some sort of command to the device, and it is deemed that the device is disconnected if there is no response from the device, but with this technique, a command for disconnection detection needs to be issued periodically, and software control in the host becomes complicated.

In view of this, in this embodiment, a configuration is realized in which if the device is disconnected during HS mode communication, the host can detect that disconnection of the device. Specifically, as shown in FIG. 12, the first physical layer circuit 11 connected to the first bus BS1 is provided with a first upstream port detection circuit 91 and a disconnection detection circuit 93. Also, the second physical layer circuit 12 connected to the second bus BS2 is provided with a second upstream port detection circuit 92 and a disconnection detection circuit 94. The first and second upstream port detection circuits 91 and 92 enter the operation enabled state upon receiving an HS mode signal, which is a switch-to-HS-mode signal, that is output from the bus monitor circuit 30. In other words, the operation enabled state is entered when a switch from the FS mode to the HS mode is performed. Also, the first and second upstream port detection circuits 91 and 92 successively analyze the PID of HS packets received from the first and second buses BS1 and BS2, and either one of the first and second upstream port detection circuits 91 and 92 detects an SOF transmitted by the host. Also, the first and second upstream port detection circuits 91 and 92 notify SOF detection results to the bus monitor circuit 30 with use of SOF detection signals SDET1 and SDET2. Accordingly, the bus monitor circuit 30 recognizes whether the bus that is on the upstream side and connected to the host is the first bus BS1 or the second BS2. The bus monitor circuit 30 respectively outputs the SOF detection signals SDET1 and SDET2 as operation enable signals ENB2 and ENB1 that are clock-synchronized. The operation enable signals ENB1 and ENB2 are input to the disconnection detection circuits 93 and 94. In this case, the disconnection detection circuit that is on the downstream side and did not detect an SOF enters the operation enabled state. Note that the operation setting circuit 31 of the bus monitor circuit 30 outputs the operation enable signals ENB1 and ENB2 based on the detection signals SDET1 and SDET2.

Upon entering the operation enabled state, the disconnection detection circuits 93 and 94 respectively examine the EOP signal amplitude of the repeat waveform of the SOF output to the first and second buses BS1 and BS2 via the processing circuit 20. If the EOP signal amplitude exceeds 625 mV, it is determined that the device was disconnected, and this is notified to the bus monitor circuit 30 with use of disconnection detection signals DDET1 and DDET2. Note that the signal amplitude threshold value that is used when making the disconnection detection determination can be set in the range of 525 mV to 625 mV. In the case of receiving a notification of device disconnection by the disconnection detection signal DDET1 or DDET2, the bus monitor circuit 30 performs processing for switching the operation mode from the HS mode to the FS mode, and switches the transfer route from the transfer route TR2 that passes through the processing circuit 20 to the transfer route TR1 that passes through the bus switch circuit 40. Specifically, the operation setting circuit 31 of the bus monitor circuit 30 performs this switching processing. In the method of the comparative example described above, the host detects device disconnection via the bus switch circuit 40 that has been turned on.

Figure 13:
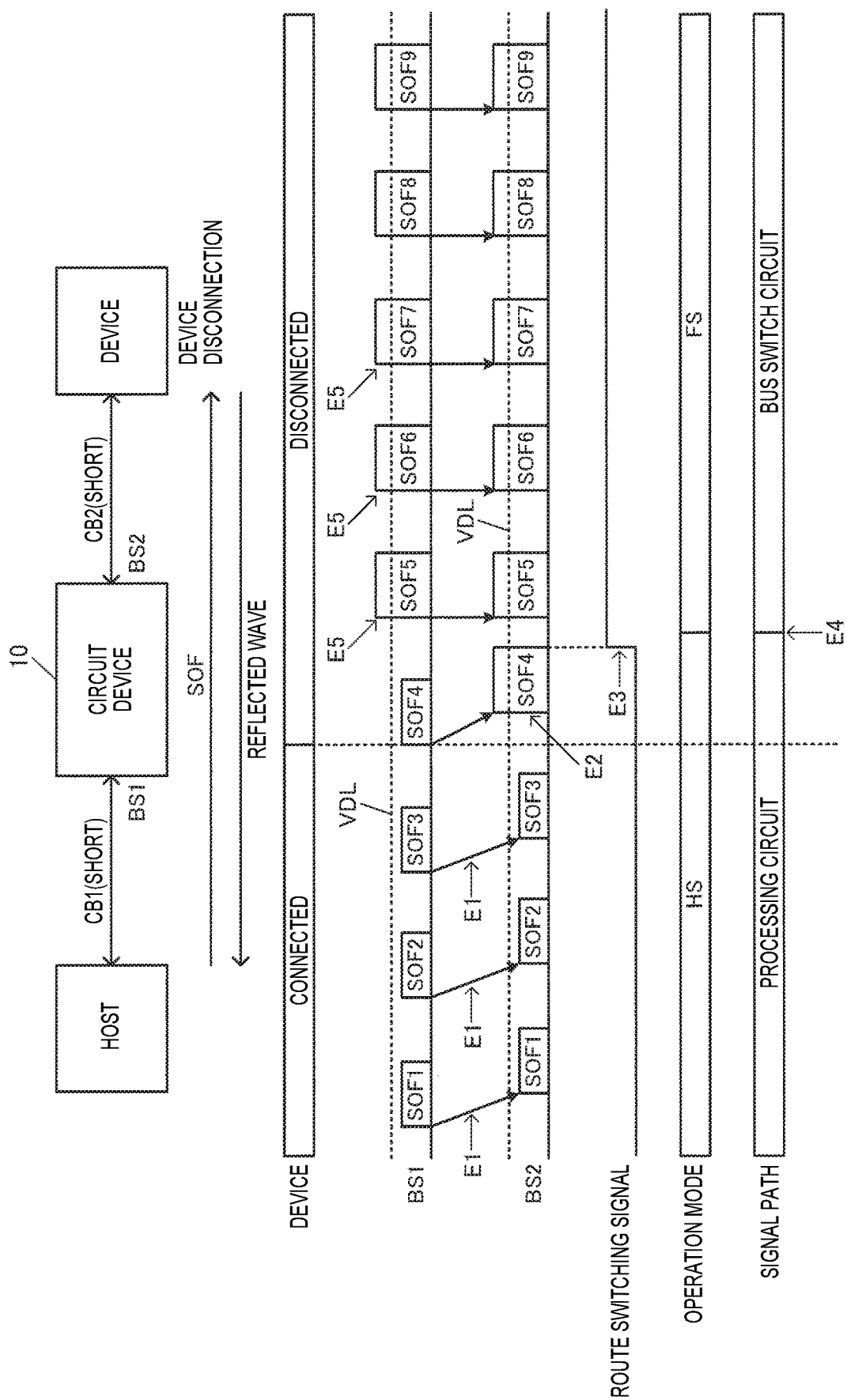
FIG. 13 is an illustrative diagram regarding a problem that occurs at the time of device disconnection.
Figure 14:
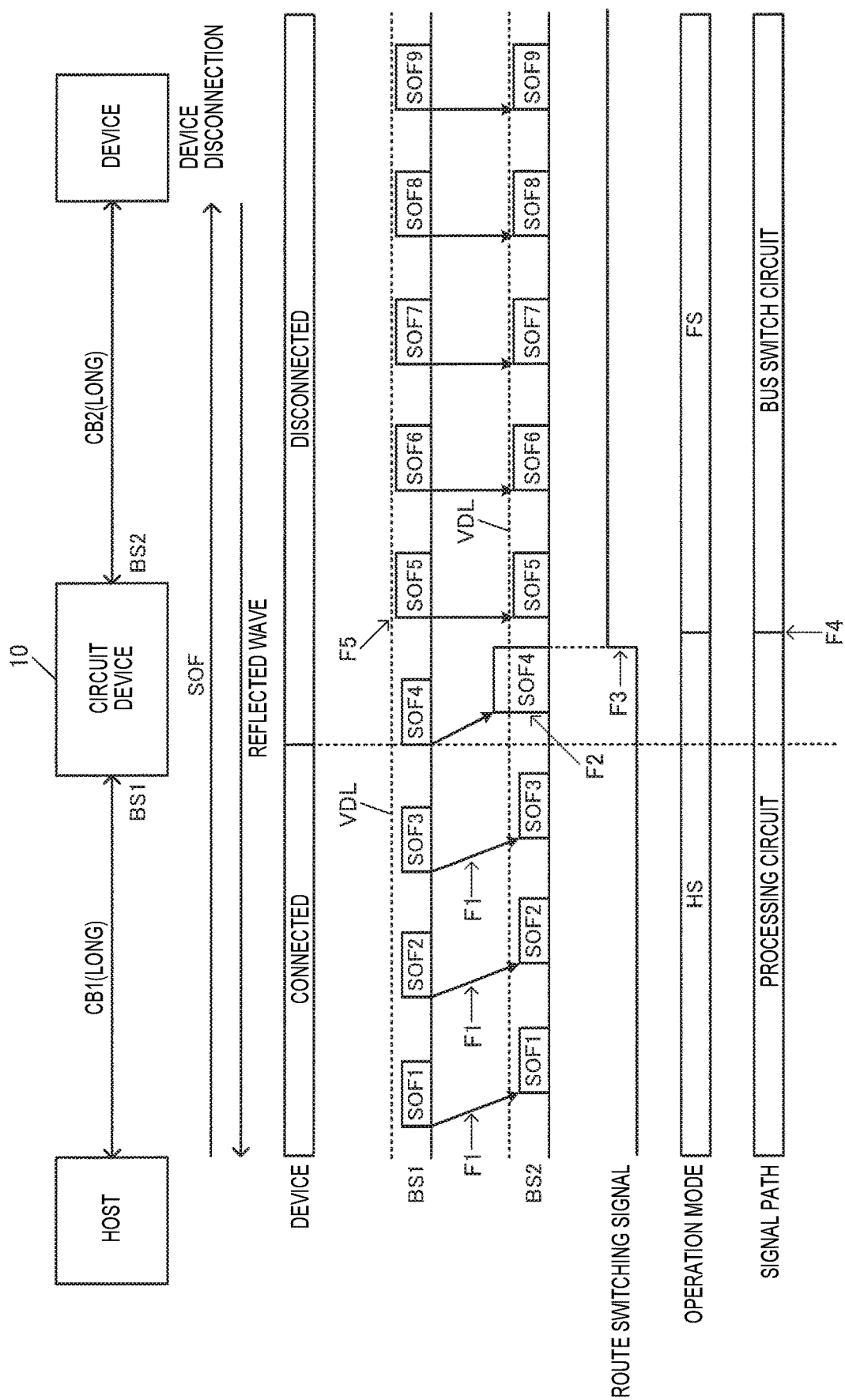
FIG. 14 is an illustrative diagram regarding the problem that occurs at the time of device disconnection.

However, it was determined that a problem occurs that, with the method of the above-described comparative example, as a result of a reflected wave of an SOF from the device side being superimposed on the EOP of the SOF to be detected by the host, the host cannot appropriately detect device disconnection. FIGS. 13 and 14 are illustrative diagrams regarding the problem that occurs when a device is disconnected. Here, the host is connected to the first bus BS1, the device is connected to the second bus BS2, and HS mode communication is performed. Note that, as described above, similar processing is performed when the host is connected to the second bus BS2, and the device is connected to the first bus BS1, and therefore a detailed description thereof is omitted.

FIG. 13 shows an exemplary operation when the USB cable CB1 that connects a host and the circuit device 10 and the USB cable CB2 that connects the circuit device 10 and a device are short. As indicated by E1 in FIG. 13, in the HS mode, an SOF packet that indicates the head of a frame is transmitted from the host every 125 μs. Unlike other token packets, this SOF packet is used by the host to indicate the frame number, and the device does not need to respond to this. Also, unlike other packets, the EOP of the SOF packet has a length of 40 bits. Note that, in order to simplify the description, an SOF packet will be simply referred to as an SOF, as appropriate. Also, only the SOF is output from the host as the HS packet.

When the device is disconnected at a far end of the USB cable CB2, when viewed from the circuit device 10, the HS termination in the device is lost. With this, as indicated by E2 in FIG. 13, the signal amplitude of an HS packet (SOF4) in the second bus BS2 increases. The circuit device 10 detects this increase using the disconnection detection circuit 94, activates the route switching signal as indicated by E3 when the signal amplitude of the EOP of an SOF exceeds a disconnection detection level VDL, and switches the signal path from the path through the processing circuit 20 to the path through the bus switch circuit 40 as indicated by E4. Hereinafter, the HS packets output from the host pass through the bus switch circuit 40 inside the circuit device 10, and as a result of the HS termination of the device being lost, the signal amplitude of the HS packets (SOF5, SOF6, SOF7, . . . ) also increases as indicated by E5. The host detects the increase in the signal amplitude using the disconnection detection function of its own, and determines that the device is disconnected when the signal amplitude of the EOP of an SOF exceeds the disconnection detection level.

Here, although a problem does not arise in the operation when the total cable length of the USB cables CB1 and CB2 is short, as shown in FIG. 13, when the total cable length increases, a problem occurs that the disconnection detection of the host does not function. An operation example in this case is shown in FIG. 14. As indicated by F1 in FIG. 14, the host transmits HS packets. When the device is disconnected at a far end of the USB cable CB2, when viewed from the circuit device 10, the signal amplitude of the HS packets (SOF4) in the second bus BS2 increases as indicated by F2, and the circuit device 10 detects this increase using the disconnection detection circuit 94. Then, when the signal amplitude of the EOP of an SOF exceeds the disconnection detection level VDL, the route switching signal is activated as indicated by F3, and the signal path is switched from the path through the processing circuit 20 to the path through the bus switch circuit 40, as indicated by F4.

Hereinafter, the HS packets output from the host pass through the bus switch circuit 40 inside the circuit device 10. Here, since the HS termination of the device is lost, it is expected that the signal amplitude of SOFs increases. However, in this operation example, since the cable lengths of the USB cables CB1 and CB2 are large, a reflected wave of an SOF with a delay is superimposed on the SOF transmitted from the host. The larger the total cable length is, the larger the delay is. If an SYNC or a PID of the reflected wave is superimposed on the EOP of an SOF, the increase in the signal amplitude of the EOP of the SOF is hampered as indicated by F5, and the signal amplitude cannot reach the disconnection detection level VDL. The host detects the EOP of an SOF using its own disconnection detection function, but if the signal amplitude of the EOP of an SOF decreases below the disconnection detection level VDL, the host cannot detect device disconnection.

Therefore, in this embodiment, a function of preventing device disconnection from being undetected by the host is realized when the device is disconnected when HS mode communication is performed, even if the length of the USB cable that connects between the host and the circuit device 10 and the USB cable that connects between the circuit device 10 and the device are large. In order to realize this function, the bus monitor circuit 30, upon being notified of a device disconnection detection signal DDET2 from the disconnection detection circuit 94 on the downstream side, disables the processing circuit 20 and starts a counting operation of the timer circuit 32. When the timer circuit 32 ends the counting operation of a predetermined time, the bus switch circuit 40 is enabled. This predetermined time corresponds to the wait period. With these measures, an off state in which both the processing circuit 20 and the bus switch circuit 40 are disabled, that is, the signal path of the USB is in high impedance, is provided during the predetermined time after the circuit device 10 detected device disconnection. During this period, the host is in a state in which only the USB cable CB1 between the host and the circuit device 10 is connected, and the signal amplitude of the EOP of an SOF can be prevented from decreasing due to the reflected wave of the SOF being superimposed on the EOP of the SOF to be detected by the host, and as a result, the device disconnection can be prevented from being undetected by the host. Furthermore, the signal path of the USB bus is switched from being not established to the signal path of the bus switch circuit 40 after having elapsed the predetermined time, which is measured by the timer circuit 32, and as a result, next device reconnection can be automatically prepared for.

Next, detailed operations of this embodiment will be described using FIG. 15. Note that, in the following, a case where the second bus BS2 is on the downstream side will be mainly described. When the first bus BS1 is on the downstream side, the disconnection detection circuit 93 detects device disconnection, and thereafter, processing similar to the case when the second bus BS2 is on the downstream side need only be performed.

Figure 15:
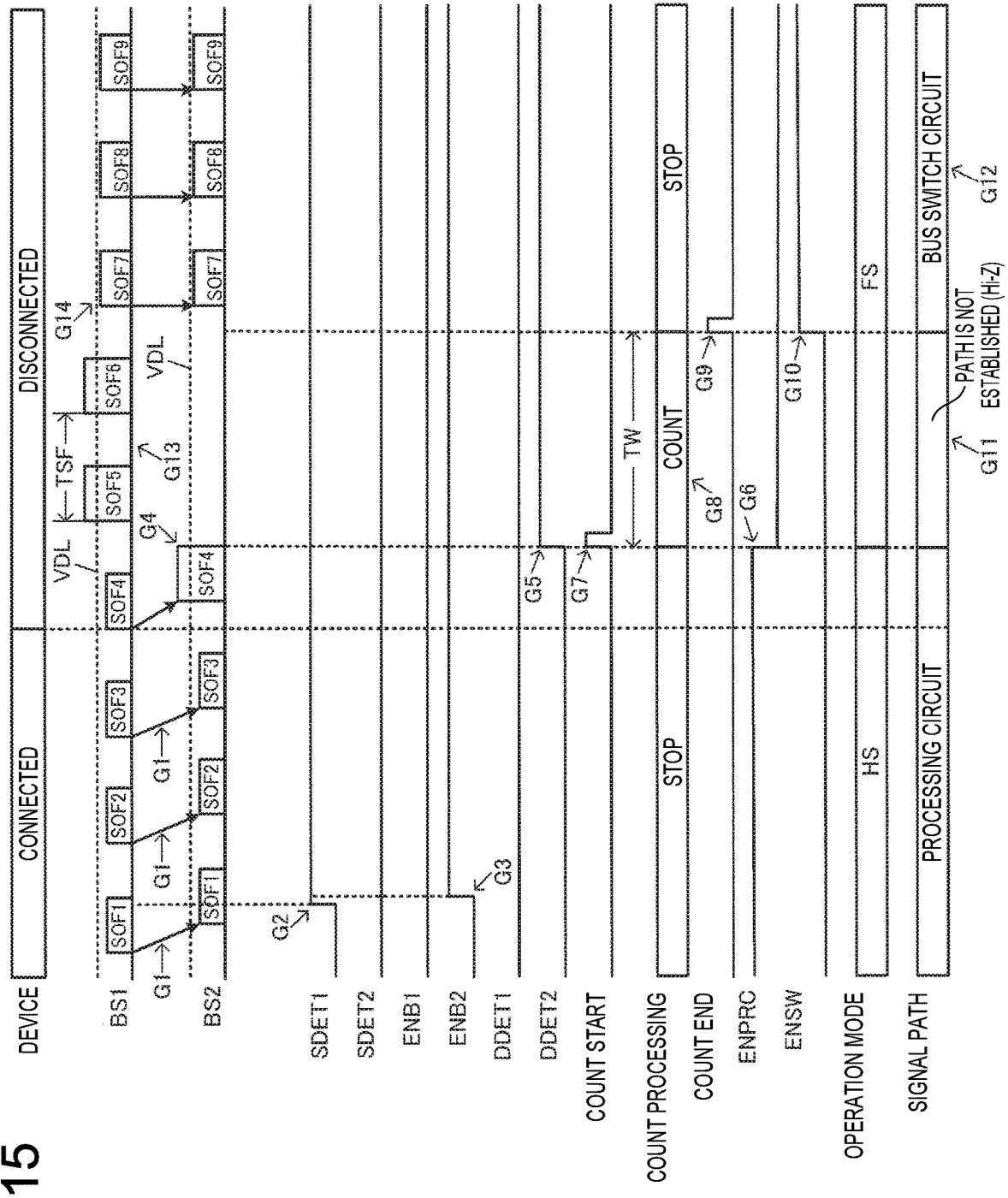
FIG. 15 is an illustrative diagram of detailed operations of an exemplary configuration of the circuit device.

As indicated by G1 in FIG. 15, an HS packet transmitted by the host is input to the first bus BS1, and is repeated and output to the second bus BS2 via the processing circuit 20. In response to this HS packet from the host, the device transmits an HS packet, and this HS packet is input to the second bus BS2 and then repeated and output to the first bus BS1 via the processing circuit 20. During HS operation, the first and second upstream port detection circuits 91 and 92 enter the operation enabled state upon receiving an HS mode signal from the bus monitor circuit 30, and the first and second upstream port detection circuits 91 and 92 successively analyze the PID of HS packets from the first and second buses BS1 and BS2 respectively. In FIG. 15, the first upstream port detection circuit 91 receives SOF1 transmitted from the host, and therefore outputs the SOF detection signal SDET1 at an H level as shown by G2. On the other hand, the second upstream port detection circuit 92 has not detected an SOF, and therefore outputs the detection signal SDET2 at an L level.

Based on the fact that the input detection SDET1 is at an H level, and the detection signal SDET2 is at an L level, the bus monitor circuit 30 recognizes that the bus that is on the upstream side and is connected to the host is the first bus BS1. The detection signals SDET1 and SDET2 are then subjected to clock synchronization, and the operation enable signals ENB1 and ENB2 are output at an L level and an H level respectively, as shown by G3. The operation enable signals ENB1 and ENB2 respectively at an L level and an H level are input to the disconnection detection circuits 93 and 94 respectively. Accordingly, the disconnection detection circuit 94 on the downstream side enters the operation enabled state, and the disconnection detection circuit 93 on the upstream side enters the operation disabled state. The disconnection detection circuit 94, on the downstream side, that entered the operation enabled state continues to detect the EOP signal amplitude of the SOFs that are repeated and output to the second bus BS2, but in the period in which SOF1 to SOF3 are transferred in FIG. 15, the device is connected, and therefore the disconnection detection signal DDET2 is output at an L level.

After the SOF3 is repeated and output by the circuit device 10, when the device is disconnected at a far end of the USB cable CB2, when viewed from the circuit device 10, the signal amplitude of the EOP of an SOF4, which is repeated and output to the second bus BS2 after the SOF3, increases as indicated by G4. Then, the disconnection detection circuit 94 on the downstream side determines that the signal amplitude of the EOP of the SOF4 exceeds the disconnection detection level VDL, outputs a disconnection detection signal DDET2 at an H level as indicated by G5, and notifies the bus monitor circuit 30 of this fact. The bus monitor circuit 30 recognizes that the device is disconnected on the second bus BS2 side from the disconnection detection signal DDET2 at an H level and disconnection detection signal DDET1 at an L level that have been input, and causes the operation mode to transition from the HS mode to the FS mode. Furthermore, the bus monitor circuit 30 generates an operation enable signal ENPRC of the processing circuit 20 at an L level as indicated by G6 based on the disconnection detection signal DDET2 at an H level, sets the processing circuit 20 to an operation disabled state, which is a disabled state, and stops the transfer processing of the processing circuit 20. Also, the bus monitor circuit 30 generates a pulse signal for starting counting as indicated by G7 based on the disconnection detection signal DDET2 at an H level, and outputs the pulse signal to the timer circuit 32. With this, the count processing of the timer circuit 32 is started as indicated by G8. Note that the operation enable signal ENPRC and the pulse signal for starting the timer are generated by the operation setting circuit 31.

The timer circuit 32, upon the count value reaching a count value corresponding to the length of the wait period, outputs a pulse signal for indicating the end of counting as indicated by G9, and stops count processing. In this operation example, the count processing stops after an SOF6 is output. Then, at the timing at which the count processing ends, the bus monitor circuit 30 outputs an operation enable signal ENSW of the bus switch circuit 40 at an H level as indicated by G10, and switches on the connection of the bus switch circuit 40. With this, as indicated by G11 and G12, the signal path is switched from a state of being not established to the path of the bus switch circuit 40. Note that the operation enable signal ENSW is a switching control signal for switching the bus switch circuit 40 from off to on.

In a period in which the operation enable signal ENPRC of the processing circuit 20 is at an L level and the operation enable signal ENSW of the bus switch circuit 40 is at an L level, since both the processing circuit 20 and the bus switch circuit 40 are turned off, the signal path enters a state of being not established, which is in a high impedance state. In this operation example, the signal path enters a state of being not established, as indicated by G11, in a period indicated by G13 in which the host transmits the SOF5 and SOF6, and as a result, the SOF5 and SOF6 from the host do not reach the second bus BS2 side. Therefore, as a result of not being influenced by the USB cable CB2 between the circuit device 10 and the device, and being influenced only by the reflected wave with a delay due to the USB cable CB1 between the host and the circuit device 10, the degree of superimposition of the reflected wave on the EOP of an SOF decreases. Therefore, the signal amplitude of the EOPs of the SOF5 and SOF6 transmitted from the host will not decrease below the disconnection detection level VDL, and as a result, the host can appropriately detect device disconnection.

That is, in F5 in FIG. 14, the reflected wave with respect to an SOF transmitted from the host is transmitted to the USB cable CB1 from the USB cable CB2 through the circuit device 10, and is superimposed on the EOP of the SOF, and as a result, the signal amplitude of the EOP decreases, as will be described later. When the signal amplitude of the EOP decreases in this way, the host cannot detect device disconnection.

In contrast, in this embodiment, since the connection in the bus switch circuit 40 is switched off in a period in which the host transmits the SOF5 and SOF6 in FIG. 15, the signal amplitude of the EOP is not influenced by the USB cable CB2 between the circuit device 10 and the device. Also, even in a case where the reflected wave is superimposed on the SOF5 and SOF6 transmitted from the host, since the cable length of the USB cable CB1 is smaller than the total length of the USB cables CB1 and CB2, the degree of superimposition of the reflected wave is small, and the signal amplitude of the EOP will not decrease below the disconnection detection level VDL. Therefore, the host can appropriately detect device disconnection.

As described above, according to this embodiment, if the device is disconnected during HS mode communication, the HS termination from the device is lost, the SOF waveform with an increased signal amplitude can be directly detected by the host, and the host can easily determine that the device was disconnected.

Note that, in this embodiment, the timer circuit 32 measures the elapse of the wait period from the timing G7 in FIG. 15 at which device disconnection was detected. That is, the timer circuit 32 starts count processing at the timing G7 at which device disconnection was detected, and when the count value reaches a count value corresponding to the length TW of the wait period, stops the count processing, and outputs a pulse signal indicating the end of counting as indicated by G9. In this case, when the issue interval of the SOF is denoted by TSF, as shown in FIG. 15, the length TW of the wait period satisfies TW>TSF. The issue interval TSF of the SOF is 125 μs, and the length TW of the wait period is longer than 125 μs. In this way, in the wait period whose length satisfies TW>TSF, the host transmits at least one SOF, and can detect device disconnection. In this case, it is desirable that TW≥2×TSF is satisfied in this embodiment. In this way, the host can detect device disconnection by transmitting two or more SOFs as indicated by G13 in FIG. 15, and as a result, the device disconnection can be more reliably detected.

Also, in this embodiment, when device disconnection is detected, the bus monitor circuit 30 outputs a signal for stopping the transfer processing of the processing circuit 20 as indicated by G6 in FIG. 15. That is, the bus monitor circuit 30 outputs the operation enable signal ENPRC of the processing circuit 20 at an L level. With this, the transfer processing of the processing circuit 20 is turned off, and a state can be achieved in which the signal path is not established as indicated by G11. Then, after the wait period has elapsed from the timing at which device disconnection was detected, the bus monitor circuit 30 outputs a signal for switching the connection between the first bus BS1 and the second bus BS2 from off to on to the bus switch circuit 40 as indicated by G10. That is, the bus monitor circuit 30 outputs the operation enable signal ENSW of the bus switch circuit 40 at an H level. With this, signal exchange between the host and the device via the bus switch circuit 40 is enabled, and device reconnection can be prepared for.

4. Superimposition of Reflected Wave

Figure 16:
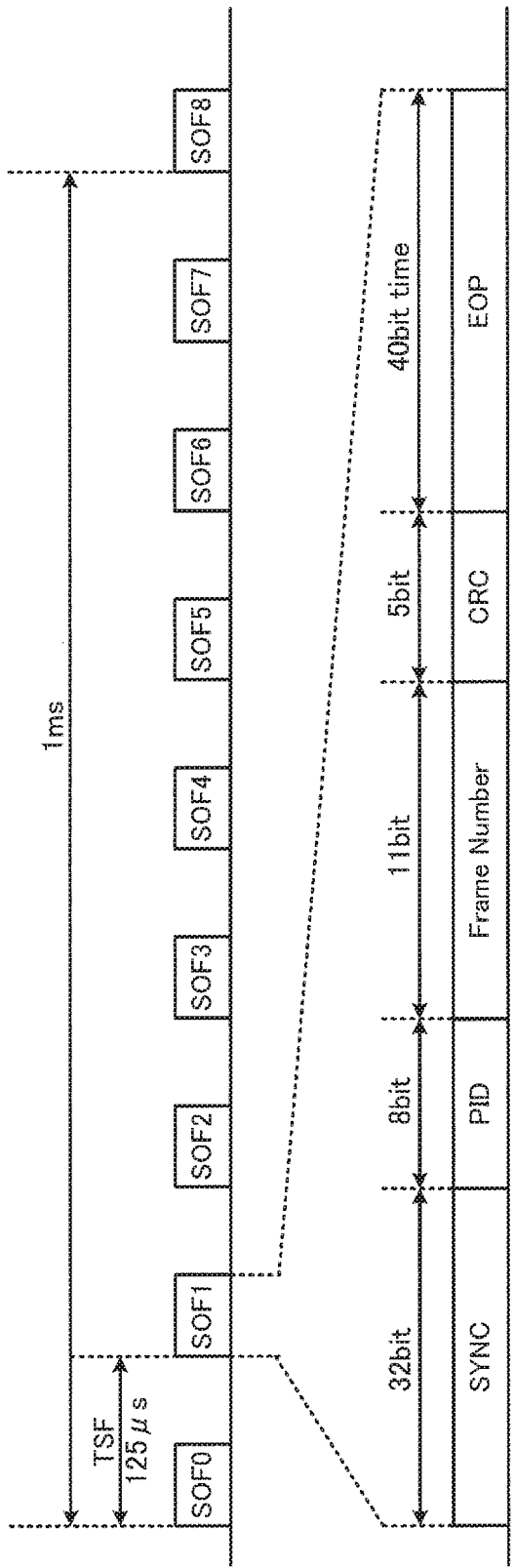
FIG. 16 is an illustrative diagram of an SOF packet.

Next, the problem of superimposition of the reflected wave on the EOP of an SOF will be described in detail. FIG. 16 is an illustrative diagram of the SOF packet. As shown in FIG. 16, the host transmits the SOF every TSF=125 μs. Also, the SOF is constituted by SYNC, PID, FrameNumber, CRC, and EOP. The SYNC is a field for synchronization. The host outputs a 32-bit SYNC. Every time the SYNC has passed through a HUB, a maximum of 4 bits are deleted from the top, and therefore a minimum of 12-bit SYNC is permitted. The PID is a field for packet recognition, and an 8-bit identifier is set therein. The FrameNumber is a field for frame management specific to the SOF, and includes 11 bits. The CRC is a 5-bit field for error detection. The EOP is a field for indicating the end of the packet. The EOP of an SOF is used to detect device disconnection, and therefore is extended to 40-bit time, although the EOP of a packet other than the SOF is 8-bit time.

Figure 17:
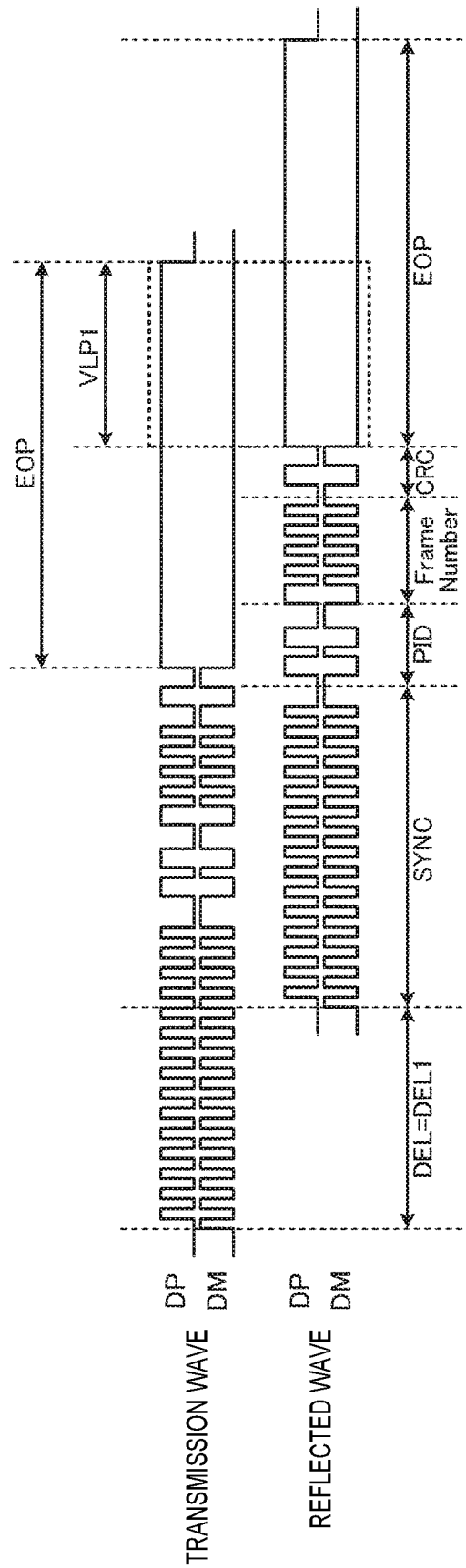
FIG. 17 is an illustrative diagram regarding a problem that occurs when a reflected wave is superimposed on a transmission wave.
Figure 18:
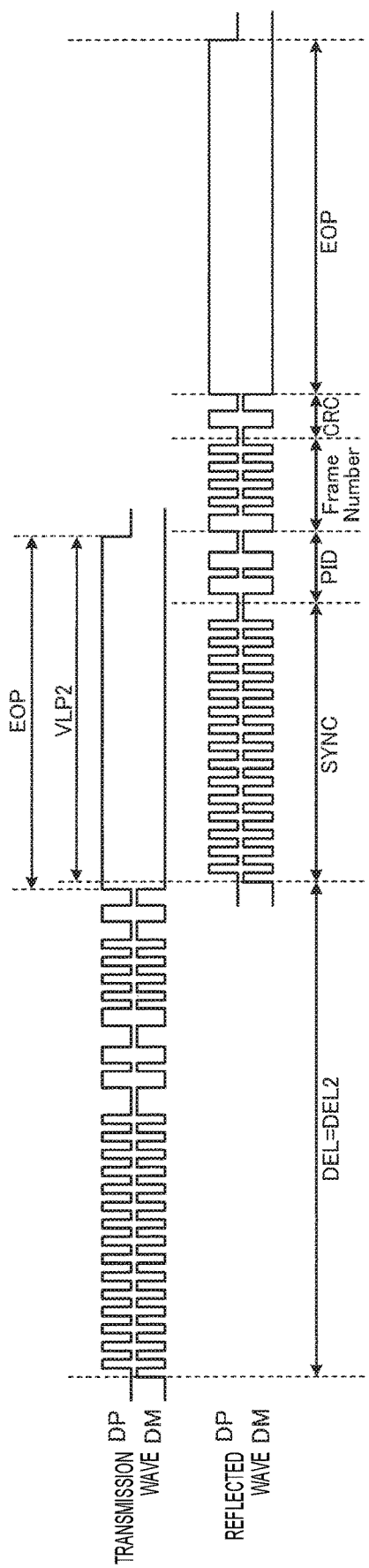
FIG. 18 is an illustrative diagram regarding the problem that occurs when a reflected wave is superimposed on a transmission wave.

FIGS. 17 and 18 are illustrative diagrams regarding a problem that occurs as a result of the reflected wave of a transmission wave of an SOF being superimposed on the EOP of the SOF to be detected by the host. When an HS termination of 45Ω termination is lost due to device disconnection, a reflected wave is superimposed on the EOP of an SOF to be detected by the host. FIG. 17 shows a case where the total cable length of the USB cables is small, and the delay DEL=DEL1 of the reflected wave is small, as in FIG. 13. FIG. 18 shows a case where the total cable length of the USB cables is large, and the delay DEL=DEL2 of the reflected wave is large, as in FIG. 14. The delay DEL of a reflected wave corresponds to a period obtained by dividing the cable length through which the reflected wave propagates by the propagation velocity of the electromagnetic wave, which is the propagation velocity of the reflected wave. Therefore, the larger the cable length through which the reflected wave propagates is, the larger the delay DEL is.

In FIG. 17, since the total cable length is small, and the delay DEL is small, and therefore, a temporally superimposed part VLP1 is present between the EOP of the transmission wave from the host and the EOP of the reflected wave. The signal amplitude of the EOP does not decrease in this superimposed part VLP1, and therefore the host can detect device disconnection.

On the other hand, in FIG. 18, since the total cable length is large and the delay DEL is large, a superimposed part is not present between the EOP of the transmission wave from the host and the EOP of the reflected wave. Also, in FIG. 18, the SYNC and PID of the reflected wave are superimposed on the EOP of the transmission wave from the host in the superimposed part VLP2. The values of the SYNC and PID are the same for every frame, and the level thereof inverts every 1 or 2-bit time. Therefore, in the superimposed part VLP2, the DC component of the signal amplitude of the EOP does not increase, and as a result, the host cannot detect device disconnection.

Figure 19:
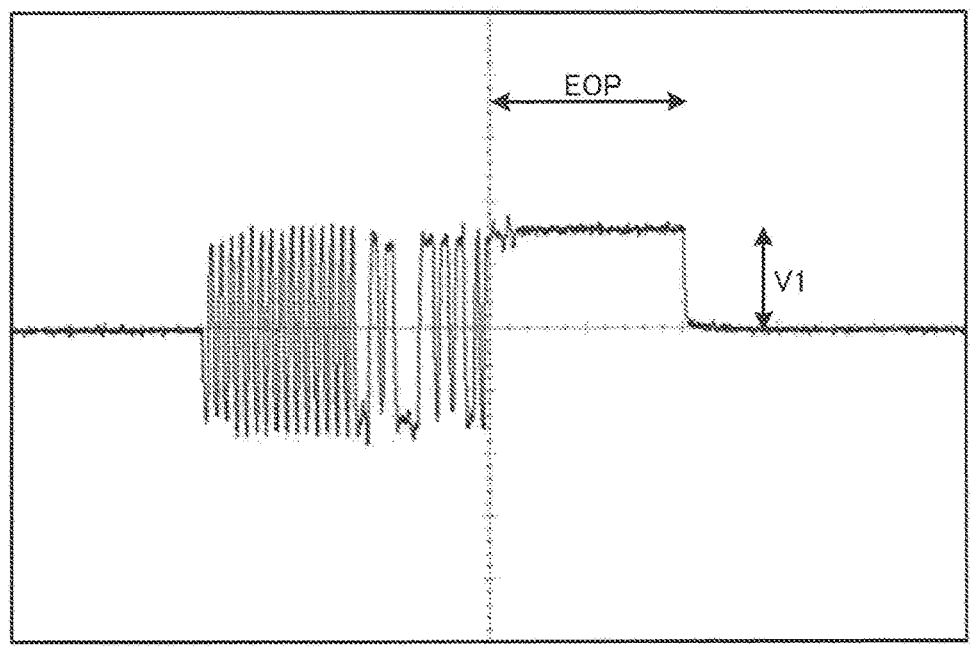
FIG. 19 is an SOF waveform when device disconnection is not performed.

FIG. 19 shows an example of a measured waveform of an SOF when device disconnection is not performed. In FIG. 19, device disconnection is not performed, and because an impedance matched state is achieved due to HS termination of 45Ω termination of a device, a reflected wave is not generated. Also, due to the HS termination, the signal amplitude V1 of the EOP of the SOF transmission wave from the host is about 400 mV, for example.

Figure 20:
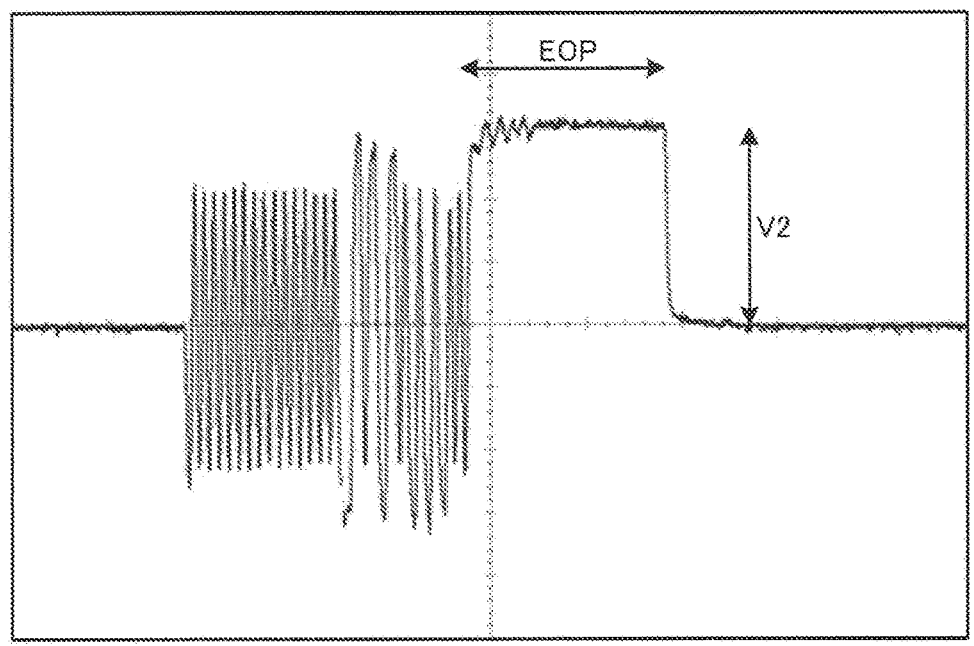
FIG. 20 is an exemplary SOF waveform when device disconnection is performed and a device-side cable length is 0 m.

FIG. 20 shows an example of a measured waveform of an SOF when device disconnection is performed and the cable length of the USB cable CB2 on the device side is 0 m. In FIG. 20, an influence of a reflected wave is not observed even in an impedance unmatched state. Also, the signal amplitude V2 of the EOP of the transmission wave is about 800 mV, for example, and exceeds the disconnection detection level VDL.

Figure 21:
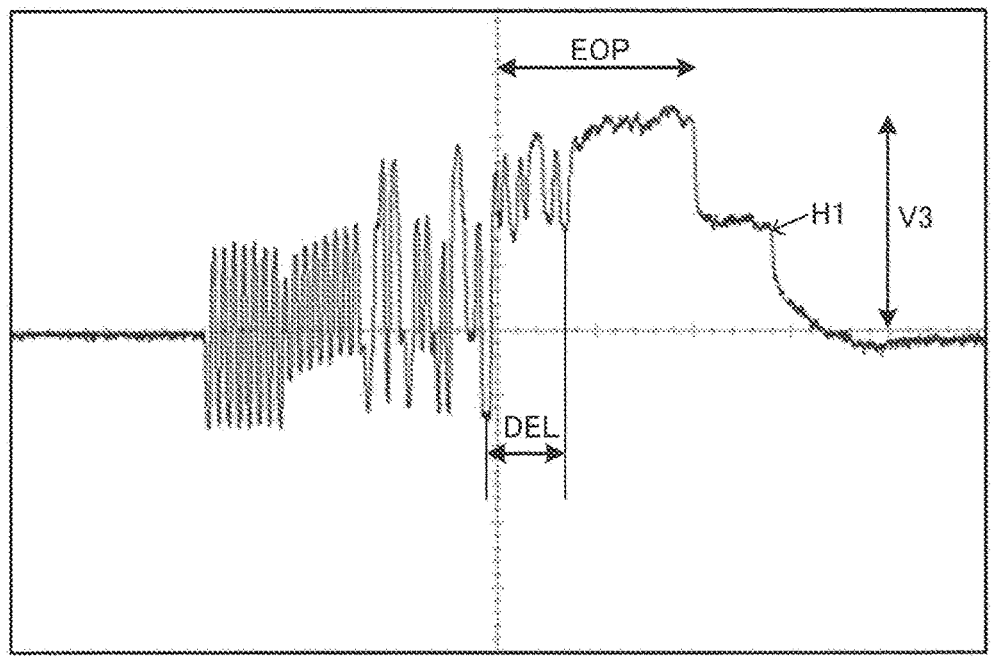
FIG. 21 is an exemplary SOF waveform when device disconnection is performed and the cable length is short.

FIG. 21 shows an example of a measured waveform of an SOF when device disconnection is performed and the cable length of the USB cable CB2 on the device side is relatively small, and is about 3 m, for example. In FIG. 21, a reflected wave indicated by H1 is superimposed on the EOP of the transmission wave due to impedance mismatch. The delay DEL of the reflected wave is about 30 ns, for example. In FIG. 21, the EOP of the reflected wave is superimposed on the EOP of the transmission wave in the superimposed part VLP1, as in above-described FIG. 17. Also, the signal amplitude V3 of the EOP of the transmission wave exceeds the disconnection detection level VDL, and therefore the host can detect device disconnection.

Figure 22:
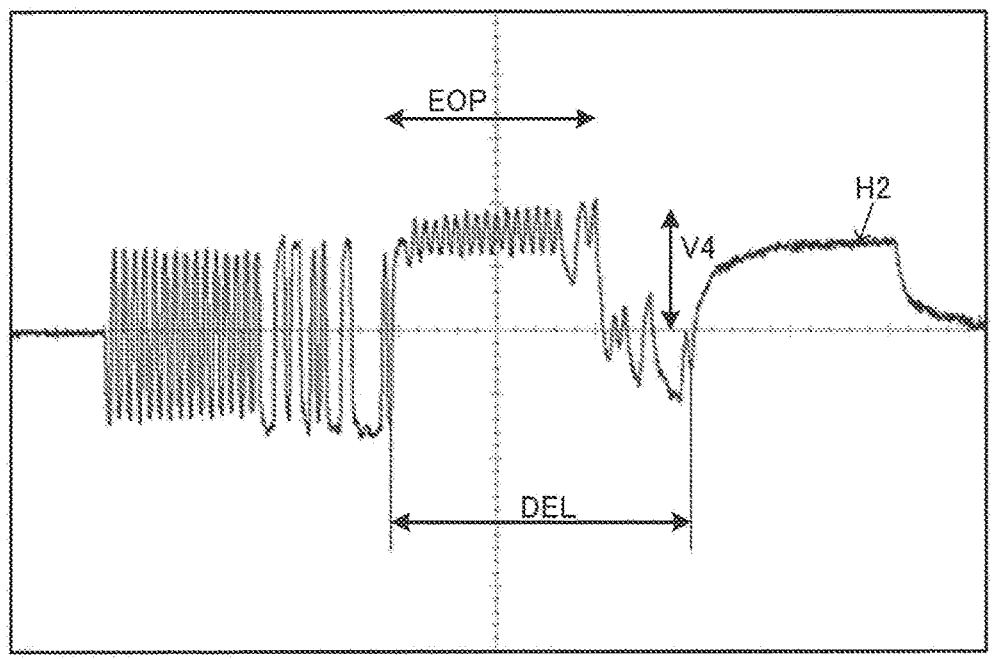
FIG. 22 is an exemplary SOF waveform when device disconnection is performed and the cable length is long.

On the other hand, FIG. 22 shows an example of a measured waveform of an SOF when device disconnection is performed and the cable length of the USB cable CB2 on the device side is larger than 10 m, and is about 13 m, for example. In FIG. 22, a reflected wave indicated by H2 is superimposed on the transmission wave due to impedance mismatch. The delay DEL of the reflected wave is about 120 ns, for example. In FIG. 22, the SYNC and PID of the reflected wave are superimposed on the EOP of the transmission wave in the superimposed part VLP2, as in above-described FIG. 18. With this, the signal amplitude V4 of the EOP of the transmission wave decreases below the disconnection detection level VDL. Therefore, the host cannot detect device disconnection.

In this embodiment, even in a case where the cable length is large, as in FIGS. 18 and 22, not only the signal path of the processing circuit 20, but the signal path of the bus switch circuit 40 is switched off in a wait period having a length TW, as indicated by G11 in FIG. 15. Therefore, a state is entered in which only the USB cable CB1 on the host side is connected to the host, the degree of superimposition of a reflected wave of an SOF on the EOP of the SOF to be detected by the host is small, and the signal amplitude of the EOP will not decrease below the disconnection detection level VDL. That is, as a result of the signal path of the bus switch circuit 40 being switched off, the USB cable CB2 on the device side is disconnected, and a state similar to the case where the total cable length is small is achieved. Therefore, even if the reflected wave is superimposed on the EOP of the transmission wave, the signal amplitude of the EOP exceeds the disconnection detection level VDL, as in the case of FIG. 21, and the host can appropriately detect device disconnection.

5. Details of Physical Layer Circuit

Figure 23:
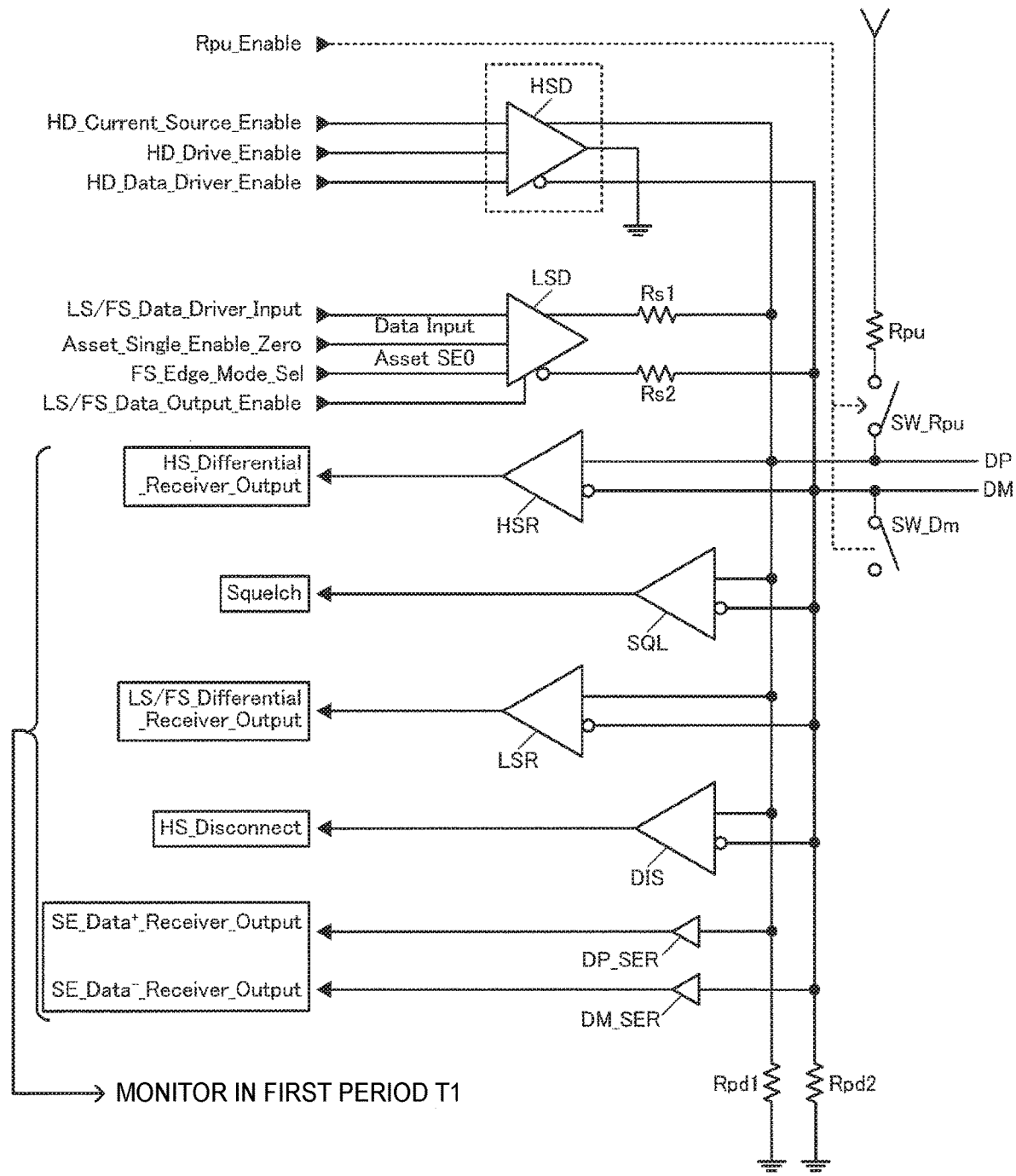
FIG. 23 shows an exemplary configuration of a physical layer circuit.

FIG. 23 shows an exemplary configuration of the physical layer circuit. Here, the first physical layer circuit 11 and the second physical layer circuit 12 are collectively referred to as the physical layer circuit. The physical layer circuit includes a pull-up resistor Rpu, switch elements SW_Rpu and SW_Dm, and pull-down resistors Rpd1 and Rpd2. The switch element SW_Rpu is switched on or off based on a control signal Rpu_Enable. With this, a pull-up operation is realized. Also, the physical layer circuit includes a transmission circuit HSD, which is a current driver for HS mode, a transmission circuit LSD, which is a current driver for LS/FS mode, and resistors Rs1 and Rs2. At the time of HS termination, the transmission circuit LSD outputs an L level signal, and as a result, the resistors Rs1 and Rs2 function as 45Ω terminating resistors. When HS termination is disabled, the output of the transmission circuit LSD is in a high impedance state.

Also, the physical layer circuit includes a reception circuit HSR, which is a differential data receiver for HS mode, a squelch detection circuit SQL, which is a transmission envelope detector, a differential reception circuit LSR, which is a data receiver for LS/FS mode, a disconnection detection circuit DIS, which is a disconnection envelope detector, and reception circuits DP_SER and DM_SER, which are single-end receivers.

Also, in this embodiment, the bus monitor operation is performed by the bus monitor circuit 30 based on a signal from an analog circuit that constitutes the physical layer circuit. Specifically, as shown in FIG. 23, the bus monitor circuit 30 performs the bus monitor operation based on a signal from the HS mode differential reception circuit HSR, the squelch detection circuit SQL, the LS/FS mode differential reception circuit LSR, the disconnection detection circuit DIS, or the single-end reception circuits DP_SER and DM_SER. Specifically, based on signals from these analog circuits, the bus monitor circuit 30 can monitor bus states such as device chirp K, host chirp K/J, idle, reset, suspend, resume, SE0, J, K, bus reset, or HS disconnect. Based on the monitor result, the bus monitor circuit 30 performs control for switching on or off switch elements of the bus switch circuit 40, and performs control for switching on or off transfer processing of the processing circuit 20. According to this configuration, it is possible to realize appropriate switch control performed by the bus switch circuit 40 and transfer control performed by the processing circuit 20 that are based on an appropriate determination of the bus state.

6. Electronic Device, Cable Harness

Figure 24:
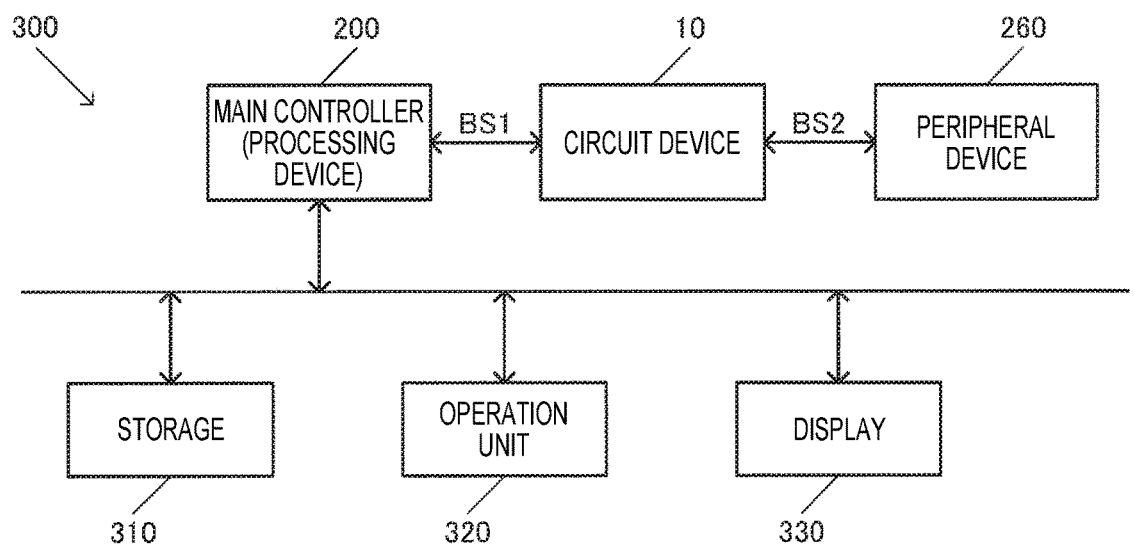
FIG. 24 shows an exemplary configuration of an electronic device.

FIG. 24 shows a configuration example of an electronic device 300 that includes the circuit device 10 of this embodiment. This electronic device 300 includes the circuit device 10 of this embodiment and the main controller 200, which is a processing device. The main controller 200 is connected to the first bus BS1. For example, the main controller 200 and the circuit device 10 are connected via the first bus BS1. Also, the peripheral device 260, for example, is connected to the second bus BS2 of the circuit device 10.

The main controller 200 is realized by a processor such as a CPU or an MPU. Alternatively, the main controller 200 may be realized by any of various ASIC circuit devices. Moreover, the main controller 200 may be realized by a circuit board on which multiple circuit devices (ICs) and circuit components are mounted. The portable terminal device 250 shown in FIG. 1 or the like can be envisioned as the peripheral device 260, but there is no limitation to this. The peripheral device 260 may be a wearable device or the like.

The electronic device 300 can further include a storage 310, an operation unit 320, and a display 330. The storage 310 is for storing data, and the functionality thereof can be realized by an HDD (Hard Disk Drive), a semiconductor memory such as a RAM or a ROM, or the like. The operation unit 320 enables a user to perform input operations, and can be realized by operation devices such as operation buttons or a touch panel display. The displayer 330 is for displaying various types of information, and can be realized by a display such as a liquid crystal display or an organic EL display. Note that in the case of using a touch panel display as the operation unit 320, this touch panel display can realize the functionality of both the operation unit 320 and the display 330.

Various types of devices can be envisioned as the electronic device 300 realized by this embodiment, examples of which include a vehicle-mounted device, a printing device, a projecting device, a robot, a head-mounted display device, a biological information measurement device, a measurement device for measuring a physical quantity such as distance, time, flow speed, or flow rate, a network-related device such as a base station or a router, a content provision device that distributes content, and a video device such as a digital camera or a video camera.

Figure 25:
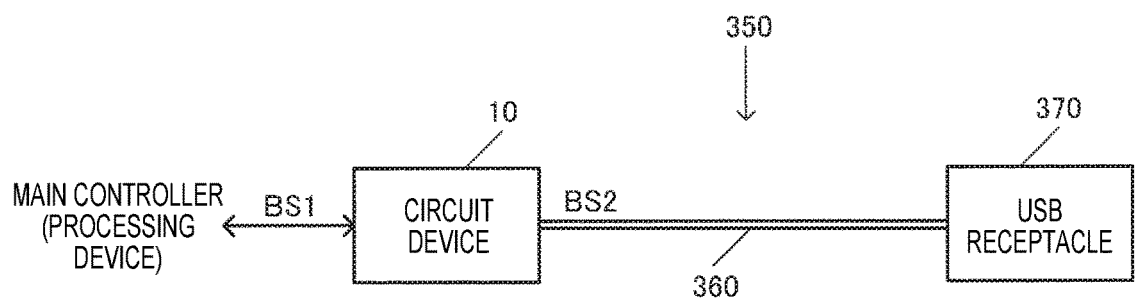
FIG. 25 shows an exemplary configuration of a cable harness.

FIG. 25 shows a configuration example of a cable harness 350 that includes the circuit device 10 of this embodiment. The cable harness 350 includes the circuit device 10 of this embodiment and a cable 360. The cable 360 is a USB cable. The cable harness 350 may include a USB receptacle 370. Alternatively, the cable harness 350 may include the electrostatic protection circuit 222 and the short-circuit protection circuit 223 in FIG. 1, for example. The cable 360 is connected to the second bus BS2 of the circuit device 10, for example. The main controller 200, which is a processing device, or the like is connected to the first bus BS1 side of the circuit device 10. This cable harness 350 is used in an application such as the routing of a wire in a vehicle, for example. Note that the cable harness 350 may be a harness for an application other than a vehicle.

Note that although an embodiment has been explained in detail above, a person skilled in the art will readily appreciate that it is possible to implement numerous variations and modifications that do not depart substantially from the novel aspects and effect of the invention. Accordingly, all such variations and modifications are also to be included within the scope of the invention. For example, terms that are used within the description or drawings at least once together with broader terms or alternative synonymous terms can be replaced by those other terms at other locations as well within the description or drawings. Also, all combinations of the embodiment and variations are also encompassed in the range of the invention. Moreover, the configuration and operation of the circuit device, the electronic device, and the cable harness, as well as the bus monitor processing, the bus switch processing, the transfer processing, the disconnection detection processing, the upstream port detection processing, the test signal detection processing, the test signal output processing, and the like are not limited to those described in the embodiment, and various modifications are possible.

What is claimed is:

1. A circuit device comprising:
a first physical layer circuit to which a first bus compliant with a USB standard is to be connected;
a second physical layer circuit to which a second bus compliant with the USB standard is to be connected;
a bus switch circuit that, having one end configured to be connected to the first bus and another end configured to be connected to the second bus, switches on connection between the first bus and the second bus in a first period, and switches off the connection in a second period; and
a processing circuit that performs, in the second period, transfer processing for transmitting a packet received from the first bus via the first physical layer circuit to the second bus via the second physical layer circuit, and transmitting a packet received from the second bus via the second physical layer circuit to the first bus via the first physical layer circuit,
wherein the second physical layer circuit includes a second-bus-side disconnection detection circuit that detects device disconnection of a device connected to the second bus, and
when device disconnection of a device connected to the second bus is detected by the second-bus-side disconnection detection circuit, the bus switch circuit, in the second period, switches the connection between the first bus and the second bus from off to on after a wait period has elapsed from a timing at which the device disconnection of a device connected to the second bus is detected.

2. The circuit device according to claim 1, further comprising a timer circuit that measures an elapse of the wait period from the timing at which the device disconnection is detected.

3. The circuit device according to claim 1, wherein TW>TSF is satisfied, where TSF is an issue interval of a Start of Frame (SOF) packet and TW is a length of the wait period.

4. The circuit device according to claim 3, wherein TW≥2×TSF is satisfied.

5. The circuit device according to claim 1, wherein, when the device disconnection of a device connected to the second bus is detected by the second-bus-side disconnection detection circuit and the bus switch circuit switches connection between the first bus and the second bus from off to on after the wait period has elapsed from the timing at which the device disconnection is detected, the processing circuit stops the transfer processing.

6. The circuit device according to claim 1,
wherein the first physical layer circuit includes a first-bus-side disconnection detection circuit that detects device disconnection of a device connected to the first bus, and
when the connection between the first bus and the second bus is off, and when device disconnection of a device connected to the first bus is detected by the first-bus-side disconnection detection circuit, the bus switch circuit switches the connection between the first bus and the second bus from off to on after a wait period has elapsed from a timing at which the device disconnection of a device connected to the first bus is detected.

7. The circuit device according to claim 6,
wherein the first physical layer circuit includes a first upstream port detection circuit that detects whether or not the first bus is a bus on an upstream side,
the second physical layer circuit includes a second upstream port detection circuit that detects whether or not the second bus is a bus on the upstream side,
when the first bus is determined to be a bus on the upstream side, the second-bus-side disconnection detection circuit detects device disconnection of a device connected to the second bus, and
when the second bus is determined to be a bus on the upstream side, the first-bus-side disconnection detection circuit detects device disconnection of a device connected to the first bus.

8. The circuit device according to claim 7,
wherein the first upstream port detection circuit determines, when a packet received from the first bus is detected to be a Start of Frame (SOF) packet, that the first bus is a bus on the upstream side, and
the second upstream port detection circuit determines, when a packet received from the second bus is detected to be an SOF packet, that the second bus is a bus on the upstream side.

9. The circuit device according to claim 1,
wherein the processing circuit, upon receiving a Start of Frame (SOF) packet from the first bus, performs processing for transmitting a repeat packet of the SOF packet to the second bus, and
the second-bus-side disconnection detection circuit detects device disconnection of a device connected to the second bus by detecting a signal amplitude of an End of Packet (EOP) in the repeat packet of the SOF packet.

10. The circuit device according to claim 1, further comprising a bus monitor circuit that performs operation of monitoring the first bus and the second bus,
wherein the bus switch circuit switches connection between the first bus and the second bus on or off based on a monitoring result of the bus monitor circuit.

11. The circuit device according to claim 10, wherein, when device disconnection of a device connected of the second bus is detected by the second-bus-side disconnection detection circuits, the bus monitor circuit outputs a signal for stopping the transfer processing of the processing circuit to the processing circuit, and outputs a signal for switching connection between the first bus and the second bus from off to on to the bus switch circuit, after the wait period has elapsed from the timing at which device disconnection of a device connected of the second bus is detected.

12. An electronic device comprising:
the circuit device according to claim 1; and
a processing device to be connected to the first bus.

13. A cable harness comprising:
the circuit device according to claim 1; and
a cable.

14. A circuit device comprising:
a first physical layer circuit having a first end and a second end, the first end being configured to be connected to a first bus that complies with a USB standard;
a second physical layer circuit having a third end and a fourth end, the fourth end being configured to be connected to a second bus that complies with the USB standard;
a bus switch circuit that switches connection between the first bus and the second bus on in a first period and off in a second period, the bus switch circuit having one end configured to be connected to the first bus and another end configured to be connected to the second bus; and
a processing circuit that is connected between the second end and the third end and performs, in the second period, transfer processing for transmitting a packet received from the first bus via the first physical layer circuit, to the second bus via the second physical layer circuit, and transmitting a packet received from the second bus via the second physical layer circuit, to the first bus via the first physical layer circuit,
wherein the second physical layer circuit includes a second-bus-side disconnection detection circuit that detects device disconnection of a device connected to the second bus, and
when device disconnection of a device connected to the second bus is detected by the second-bus-side disconnection detection circuit, the bus switch circuit, in the second period, switches the connection between the first bus and the second bus from off to on after a wait period has elapsed from a timing at which the device disconnection of a device connected to the second bus is detected.

* * * * *